(12) United States Patent
Choi

(10) Patent No.: US 11,787,041 B2
(45) Date of Patent: Oct. 17, 2023

(54) MOBILE ROBOT AND METHOD OF CONTROLLING A PLURALITY OF MOBILE ROBOTS

(71) Applicant: LG ELECTRONICS INC., Seoul (KR)

(72) Inventor: Wonjun Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 458 days.

(21) Appl. No.: 16/745,950

(22) Filed: Jan. 17, 2020

(65) Prior Publication Data
US 2020/0230806 A1    Jul. 23, 2020

(30) Foreign Application Priority Data
Jan. 17, 2019    (KR) .................. 10-2019-0006059

(51) Int. Cl.
*B25J 9/00*    (2006.01)
*B25J 11/00*   (2006.01)
*B25J 5/00*    (2006.01)

(52) U.S. Cl.
CPC ............ *B25J 9/0084* (2013.01); *B25J 5/007* (2013.01); *B25J 11/0085* (2013.01)

(58) Field of Classification Search
CPC ...... B25J 9/0084; B25J 9/1674; B25J 9/1664; B25J 5/007; B25J 11/0085; B25J 19/02; G05D 1/0274; G05D 2201/0203; G05D 1/0295; A47L 11/4072; A47L 11/4011; A47L 9/2852; A47L 2201/04
See application file for complete search history.

(56) References Cited

U.S. PATENT DOCUMENTS

| 11,185,207 B2* | 11/2021 | Mellinger, III ..... A47L 11/4061 |
| 2009/0062974 A1* | 3/2009 | Tamamoto ........... G05D 1/0295 |
| | | 701/25 |
| 2011/0264305 A1 | 10/2011 | Choe et al. |
| 2013/0145572 A1 | 6/2013 | Schregardus et al. |

(Continued)

FOREIGN PATENT DOCUMENTS

| CN | 104605794 A | 5/2015 |
| CN | 1088-88187 A | 11/2018 |

(Continued)

OTHER PUBLICATIONS

Office Action, dated Aug. 20, 2020, issued in Taiwanese Patent Application No. 109101805 (6 pages).

(Continued)

*Primary Examiner* — Khoi H Tran
*Assistant Examiner* — Nhi Q Bui
(74) *Attorney, Agent, or Firm* — Birch, Stewart, Kolasch & Birch, LLP

(57) ABSTRACT

A robot including a driver configured to move a main body, a memory configured to store an obstacle map with respect to a cleaning area, a sensor configured to collect information about the cleaning area, a communication interface configured to communicate with a second robot, and a controller is disclosed. The controller is configured to, when receiving an obstacle map including position information for a liquid region in the cleaning area from the second robot, control the main body to move to the liquid region and clean the liquid region.

6 Claims, 16 Drawing Sheets

(56) References Cited

U.S. PATENT DOCUMENTS

| | | | |
|---|---|---|---|
| 2016/0132056 A1 | 5/2016 | Yoshino | |
| 2016/0135655 A1* | 5/2016 | Ahn | G05D 1/0044 |
| | | | 15/319 |
| 2017/0203439 A1 | 7/2017 | Shin et al. | |
| 2017/0280960 A1* | 10/2017 | Ziegler | B60R 19/483 |
| 2017/0355081 A1 | 12/2017 | Fisher | |
| 2018/0092499 A1* | 4/2018 | Strazisar | G05D 1/0285 |
| 2018/0157266 A1* | 6/2018 | Xie | G05D 1/0285 |
| 2018/0242806 A1* | 8/2018 | Haegermarck | G05D 1/024 |
| 2018/0279847 A1* | 10/2018 | Park | A47L 9/2868 |
| 2018/0317725 A1* | 11/2018 | Lee | A47L 11/201 |
| 2018/0344114 A1* | 12/2018 | Scholten | A47L 9/2894 |
| 2021/0085146 A1* | 3/2021 | Cho | G05D 1/0044 |

FOREIGN PATENT DOCUMENTS

| | | |
|---|---|---|
| CN | 1089-58232 A | 12/2018 |
| DE | 10 2014 105 460 A1 | 10/2015 |
| JP | 2018-106695 A | 7/2018 |
| KR | 10-2012-0058945 | 6/2012 |
| KR | 20120058945 A * | 6/2012 |
| KR | 20140138555 A | 12/2014 |
| KR | 10-2017-0047790 | 5/2017 |
| KR | 10-2017-0048815 | 5/2017 |
| TW | 201832035 A | 9/2018 |
| TW | 201836541 A | 10/2018 |

OTHER PUBLICATIONS

PCT International Search Report dated May 13, 2020, issued in International Application No. PCT/KR2020/000860 (5 pages).

* cited by examiner

MOBILE ROBOT AND METHOD OF CONTROLLING A PLURALITY OF MOBILE ROBOTS

CROSS-REFERENCE TO RELATED APPLICATIONS

This application claims the priority benefit of Korean Application No. 10-2019-0006059, filed on Jan. 17, 2019, the contents of which are hereby incorporated by reference herein their entirety.

BACKGROUND OF THE INVENTION

1. Field of the Invention

The present disclosure relates to a mobile robot, and more particularly to a method of controlling a plurality of mobile robots such that the robots share a map with each other and perform cleaning in cooperation with each other.

2. Description of the Related Art

Robots have been developed for industrial purposes and have taken charge of portions of factory automation. In recent years, the fields in which robots are utilized have further expanded. As a result, medical robots, aerospace robots, etc. have been developed. In addition, home robots that may be used in general houses haven been manufactured. Among such robots, a robot capable of autonomously traveling is called a mobile robot. A representative example of mobile robots used in general houses is a robot cleaner.

Various kinds of technologies of sensing the environment and a user around a robot cleaner using various sensors provided in the robot cleaner are known. In addition, technologies in which a robot cleaner learns and maps a cleaning area by itself and detects a current position on a map are known. A robot cleaner capable of performing cleaning while traveling a cleaning area in a predetermined manner is known.

A conventional robot cleaner detects the distance to an obstacle or a wall and maps the environment around the cleaner using an optical sensor, which is advantageous in detecting a distance, detecting terrain, and obtaining an image of an obstacle.

In a conventional method of controlling a robot cleaner disclosed in Korean Patent Laid-open Publication No. 10-2014-0138555, a map is generated through a plurality of sensors. When a plurality of robots shares a map, each of the robots perceives a position with respect to an initial starting point. However, since each of the robots has its own starting point, it is not capable of perceiving position information or environment information about other robots.

In particular, in the case in which respectively different types of robots are used, respectively different maps are generated for the same cleaning area and the sizes and coordinate directions of the maps are different from each other due to the differences in map-generating methods between the robots and the differences in type and sensitivity between the sensors. In addition, in the case in which respectively different maps are generated, it is difficult to share position information and environment information, thus making it impossible to perform cooperative cleaning.

In order to efficiently perform cooperative cleaning using a plurality of mobile robots, each of the mobile robots needs to detect the position of another mobile robot. To this end, a position sensor, such as an ultrasonic sensor or a radar, may be additionally used to detect the position of another mobile robot. However, when the distance from the other mobile robot increases, it may be difficult to detect the position of the other mobile robot. In order to overcome this shortcoming, a high-performance sensor may be used to accurately detect the position of another mobile robot that is far away. However, the use of a high-performance sensor increases the cost of manufacturing the product.

In addition, when the cleaning types of a plurality of mobile robots are different from each other, a zone in which cleaning is not realized may be present within a cleaning area. Specifically, when a dry-type cleaner detects and suctions a liquid, a filter or other components of the dry-type cleaner may be damaged. Further, a liquid having high viscosity may not be removed by the dry-type cleaner.

SUMMARY OF THE INVENTION

Therefore, the present disclosure has been made in view of the above problems, and it is an object of the present disclosure to provide a method of controlling a plurality of mobile robots having respectively different cleaning types such that the mobile robots efficiently perform cooperative cleaning of the same space.

It is another object of the present disclosure to provide a method of controlling a plurality of mobile robots having respectively different cleaning types such that the mobile robots efficiently perform cooperative cleaning when detecting a liquid in a cleaning area.

It is still another object of the present disclosure to provide a method of controlling a plurality of mobile robots having respectively different cleaning types such that one of the mobile robots accurately transmits the position of a liquid region to another one.

It is still another object of the present disclosure to provide a mobile robot for efficiently and accurately matching different cleaning maps that are used by a plurality of mobile robots in the same space.

In accordance with the present disclosure, the above objects can be accomplished by the provision of a mobile robot configured to clean a liquid region upon receiving an obstacle map including information about the liquid region.

In accordance with an aspect of the present disclosure, there is provided a mobile robot including a driver configured to move a main body, a memory configured to store an obstacle map of a cleaning area, a sensor configured to collect information about the cleaning area, a communication interface configured to communicate with a first mobile robot, and a controller configured to, when receiving an obstacle map including position information about a liquid region present in the cleaning area from the first mobile robot, control the main body to move to the liquid region and clean at least the liquid region.

The controller may specify the liquid region based on coordinate values of the liquid region on the obstacle map.

The position information about the liquid region may include an image of the surroundings of the liquid region, and the controller may specify the liquid region based on an image of the surroundings of the main body input from the sensor.

The controller may specify the liquid region based on coordinates of the liquid region on the obstacle map and a received signal strength indicator (RSSI) value between the communication interface and the first mobile robot.

The position information about the liquid region may include a received signal strength indicator (RSSI) value between a router and the first mobile robot in the liquid region, and the controller may specify the liquid region based on coordinates of the liquid region on the obstacle map and a received signal strength indicator (RSSI) value between the router and the first mobile robot. The mobile robot may further include a liquid detection sensor configured to detect a liquid, and the controller may specify the liquid region based on coordinates of the liquid region on the obstacle map and detection values detected by the router and the liquid detection sensor.

The controller may control the driver such that the main body performs cleaning while following the first mobile robot after the main body finishes cleaning the liquid region.

The controller may control the driver such that the main body returns to the original position thereof after the main body finishes cleaning the liquid region.

In accordance with another aspect of the present disclosure, there is provided a method of controlling a plurality of mobile robots including a first mobile robot and a second mobile robot configured to perform a different type of cleaning operation from the first mobile robot, the method including detecting, by the first mobile robot, whether a liquid is present in a cleaning area, upon detecting that a liquid is present, transmitting, by the first mobile robot, an obstacle map including position information about a liquid region and a liquid region cleaning command to the second mobile robot, upon receiving, by the second mobile robot, the liquid region cleaning command, moving the second mobile robot to the liquid region, and cleaning, by the second mobile robot, the liquid region.

The second mobile robot may specify the liquid region based on at least one of coordinate values of the liquid region on the obstacle map, an image of the surroundings of the liquid region, a received signal strength indicator value between the first mobile robot and the second mobile robot, or a received signal strength indicator value between a router and each of the first mobile robot and the second mobile robot.

The first mobile robot may stand by in the vicinity of the liquid region until the second mobile robot completely moves to the liquid region.

The method may further include determining, by the first mobile robot, whether a liquid is present in the liquid region after the second mobile robot finishes cleaning the liquid region.

The method may further include, upon determining that a liquid is present in the liquid region after the second mobile robot finishes cleaning the liquid region, transmitting a signal for commanding re-cleaning of the liquid region from the first mobile robot to the second mobile robot.

The method may further include, upon determining that no liquid is present in the liquid region after the second mobile robot finishes cleaning the liquid region, performing, by the first mobile robot, cleaning in the cleaning area.

In addition, the method may further include, upon finishing cleaning the liquid region, controlling the second mobile robot to perform cleaning while following the first mobile robot.

In addition, the method may further include, upon finishing cleaning the liquid region, controlling the second mobile robot to return to the original position thereof.

The method may further include, after transmitting the liquid region cleaning command to the second mobile robot, controlling the first mobile robot to perform cleaning in the cleaning area, excluding the liquid region.

In accordance with still another aspect of the present disclosure, there is provided a method of controlling a plurality of mobile robots including a first mobile robot and a second mobile robot configured to perform a different type of cleaning operation from the first mobile robot, the method including detecting, by the first mobile robot, whether a liquid is present in a cleaning area, returning the first mobile robot to the original position thereof upon finishing cleaning the cleaning area, excluding a liquid region, upon detecting that a liquid is present, transmitting, by the first mobile robot, an obstacle map including position information about the liquid region and a liquid region cleaning command to the second mobile robot, upon receiving, by the second mobile robot, the liquid region cleaning command, moving the second mobile robot to the liquid region, and cleaning, by the second mobile robot, the liquid region.

In addition, the method may further include, upon finishing cleaning the liquid region, controlling the second mobile robot to return to the original position thereof.

In accordance with still another aspect of the present disclosure, there is provided a method of controlling a plurality of mobile robots including a first mobile robot and a second mobile robot configured to perform a different type of cleaning operation from the first mobile robot, the method including detecting, by the first mobile robot, whether a liquid is present in a cleaning area, moving the first mobile robot to the vicinity of the second mobile robot upon finishing cleaning the cleaning area, excluding a liquid region, upon detecting that a liquid is present, transmitting, by the first mobile robot, a follow command to the second mobile robot and moving the first mobile robot to the liquid region, upon receiving the follow command, controlling the second mobile robot to follow the first mobile robot to the liquid region, and cleaning, by the second mobile robot, a predetermined region near the first mobile robot after the first mobile robot arrives at the liquid region.

DETAILED DESCRIPTION OF THE PREFERRED EMBODIMENTS

Figure 1:
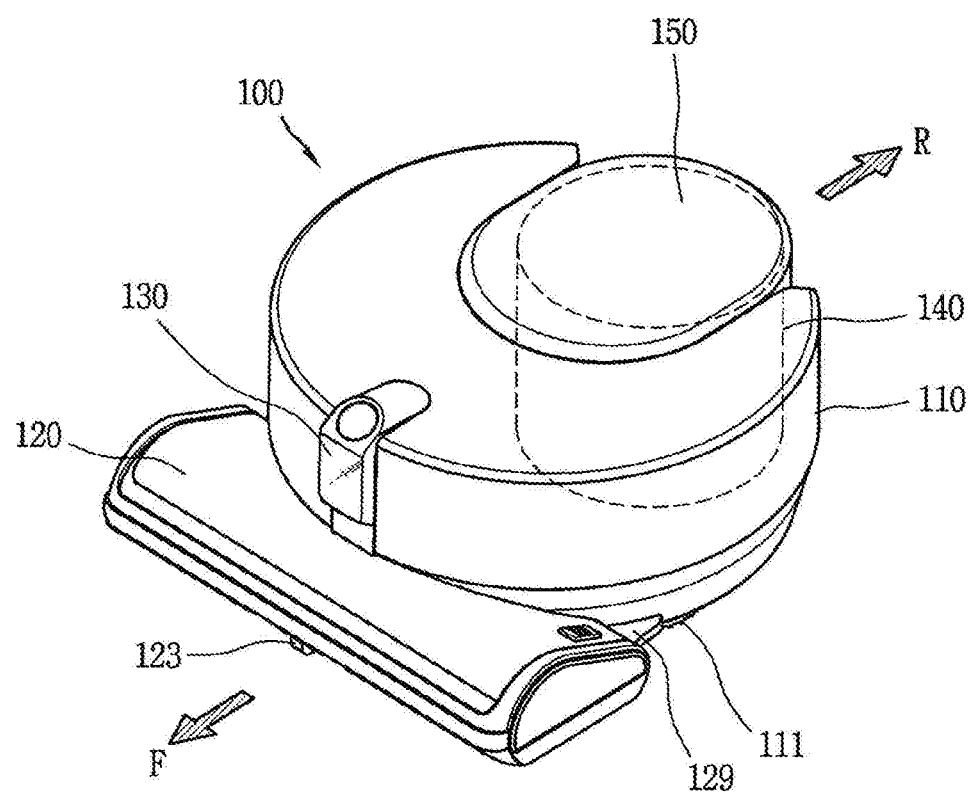
FIG. 1 is a perspective view showing an example of a robot cleaner according to the present disclosure.

Advantages and features of the present disclosure and methods for achieving them will be made clear from the embodiments described below in detail with reference to the accompanying drawings. The present disclosure may, however, be embodied in many different forms, and should not be construed as being limited to the embodiments set forth herein. Rather, these embodiments are provided so that this disclosure will be thorough and complete, and will fully convey the scope of the present disclosure to those skilled in the art. The present disclosure is merely defined by the scope of the claims. Like reference numerals refer to like elements throughout the specification.

Spatially relative terms such as "below", "beneath", "lower", "above", or "upper" may be used herein to describe one element's relationship to another element as illustrated in the figures. It will be understood that such spatially relative terms are intended to encompass different orientations of the device in addition to the orientation depicted in the figures. For example, if the device in one of the figures is turned over, elements described as "below" or "beneath" other elements would then be oriented "above" the other elements. The exemplary terms "below" or "beneath" can, therefore, encompass both positional relationships of above and below. Since the device may be oriented in another direction, spatially relative terms may be interpreted in accordance with the orientation of the device.

The terminology used in the present disclosure is for the purpose of describing particular embodiments only, and is not intended to limit the disclosure. As used in the disclosure and the appended claims, the singular forms "a", "an", and "the" are intended to include the plural forms as well, unless the context clearly indicates otherwise. It will be further understood that the terms "comprises" and/or "comprising", when used in this specification, specify the presence of stated components, steps, and/or operations, but do not preclude the presence or addition of one or more other components, steps, and/or operations.

Unless otherwise defined, all terms (including technical and scientific terms) used herein have the same meanings as those commonly understood by one of ordinary skill in the art. It will be further understood that terms such as those defined in commonly used dictionaries should be interpreted as having meanings consistent with their meanings in the context of the relevant art and the present disclosure, and are not to be interpreted in an idealized or overly formal sense unless expressly so defined herein.

A mobile robot 100 according to the present disclosure may be a robot that is capable of autonomously traveling using wheels or the like, e.g., a home robot for household uses, a robot cleaner, or the like.

Hereinafter, a robot cleaner according to the present disclosure will be described in more detail with reference to the drawings.

Embodiments disclosed in this specification will be described below in detail with reference to the accompanying drawings. It should be noted that technological terms used herein are used merely to describe a specific embodiment, not to limit the scope of the present disclosure.

Figure 2:
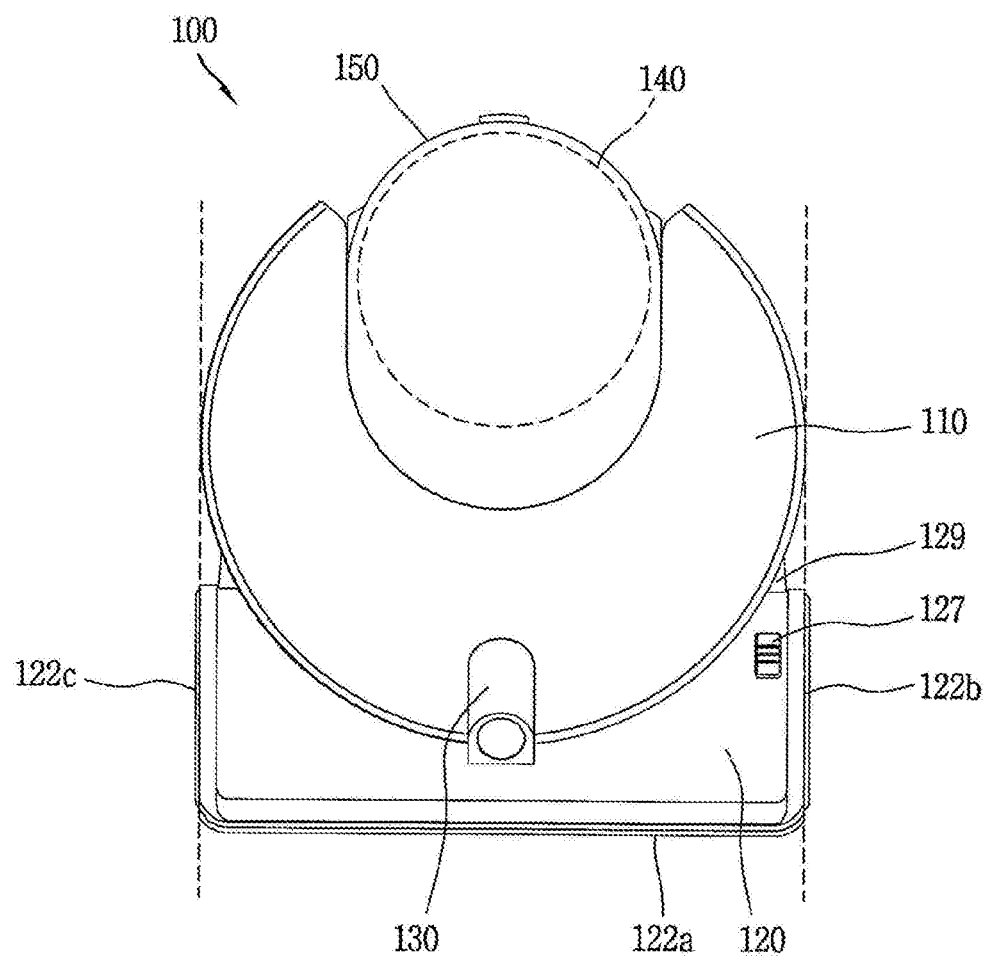
FIG. 2 is a plan view of the robot cleaner shown in FIG. 1.
Figure 3:
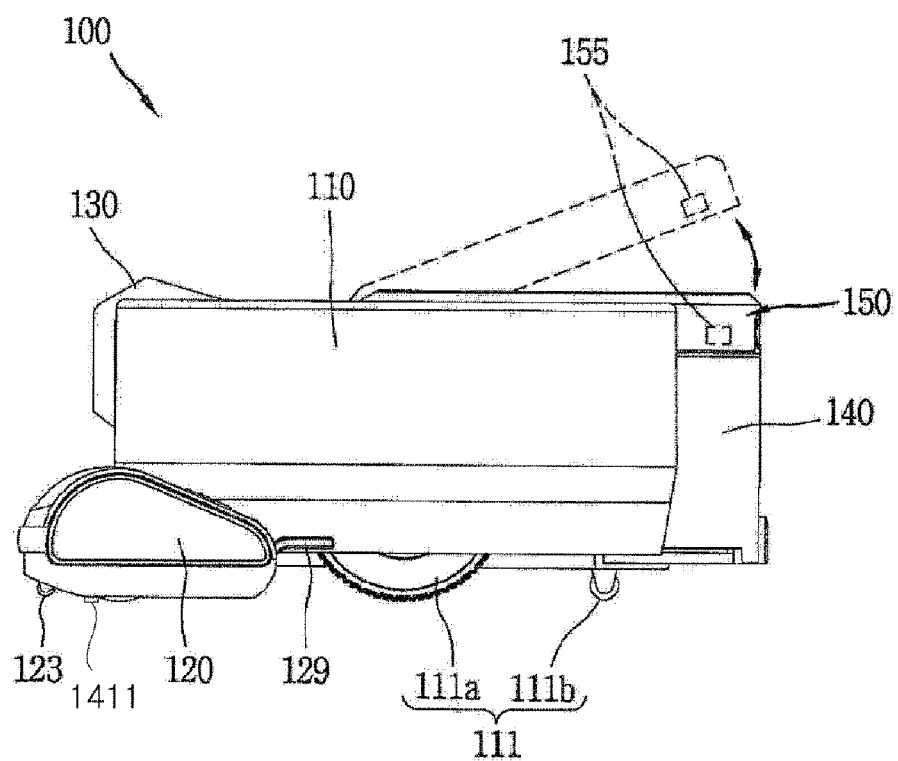
FIG. 3 is a side view of the robot cleaner shown in FIG. 1.

FIG. 1 is a perspective view showing an example of the mobile robot 100 according to the present disclosure, FIG. 2 is a plan view of the mobile robot 100 shown in FIG. 1, and FIG. 3 is a side view of the mobile robot 100 shown in FIG. 1.

In this specification, the terms "mobile robot", "robot cleaner", and "autonomous-driving cleaner" may have the same meaning. In addition, the plurality of cleaners described herein may commonly include at least some of the components to be described below with reference to FIGS. 1 to 3.

Referring to FIGS. 1 to 3, the robot cleaner 100 may perform a function of cleaning the floor while autonomously traveling in a predetermined area. Here, the floor cleaning may include suctioning dust (which includes foreign substances) or floor wiping.

The robot cleaner 100 may include a cleaner body 110, a suction head 120, side portions 122a, 122b, 122c, a sensor 130, and a dust collector 140. A controller 1800 configured to control the robot cleaner 100 and various components may be accommodated in or mounted to the cleaner body 110. In addition, a wheel 111 configured to drive the robot cleaner 100 may be provided at the cleaner body 110. The robot cleaner 100 may be moved in a forward, backward, leftward, or rightward direction, or may be rotated by the wheel 111.

Referring to FIG. 3, the wheel 111 may include a main wheel 111a and a sub-wheel 111b.

The main wheel 111a may be provided in a plural number such that the main wheels 111a are provided at opposite sides of the cleaner body 110, respectively. The main wheels 111a may be configured to be rotated in a forward direction or in a reverse direction in response to a control signal from the controller. Each of the main wheels 111a may be configured to be independently driven. For example, the main wheels 111a may be driven by different respective motors. Alternatively, the main wheels 111a may be driven by different shafts respectively coupled to a single motor.

The sub-wheel 111b may support the cleaner body 110 along with the main wheels 111a and may assist in the driving of the robot cleaner 100 by the main wheels 111a. The sub-wheel 111b may also be provided at the suction head 120 to be described later.

The controller may control the driving of the wheel 111 such that the robot cleaner 100 autonomously travels the floor.

A battery (not shown) configured to supply power to the robot cleaner 100 may be mounted in the cleaner body 110. The battery may be configured to be rechargeable, and may be detachably mounted to the bottom surface of the cleaner body 110.

As shown in FIG. 1, the suction head 120 may protrude from one side of the cleaner body 110 and may serve to suction air containing dust or to wipe the floor. The one side may be the side of the cleaner body 110 that is oriented in a forward direction F, i.e., the front side of the cleaner body 110.

The drawings illustrate a configuration in which the suction head 120 protrudes from the one side of the cleaner body 110 in the forward direction and in the leftward and rightward directions. In detail, the front end of the suction head 120 may be spaced apart from the one side of the cleaner body 110 in the forward direction, and the left and right ends of the suction head 120 may be spaced apart from the one side of the cleaner body 110 in the leftward and rightward directions, respectively.

The cleaner body 110 may be formed in a circular shape and the left and right sides of the rear end of the suction head 120 may protrude from the cleaner body 110 in the leftward and rightward directions, and thus an empty space, i.e., a gap, may be formed between the cleaner body 110 and the suction head 120. The empty space may be space between the left and right ends of the cleaner body 110 and the left and right ends of the suction head 120 and may have a shape recessed to the inner side of the robot cleaner 100.

When an obstacle is caught in the empty space, the robot cleaner 100 may be caught by the obstacle and become incapable of moving. In order to prevent this, a cover member 129 may be disposed so as to cover at least a portion of the empty space.

The cover member 129 may be provided at the cleaner body 110 or the suction head 120. In this embodiment, the cover member 129 may protrude from each of the left and right sides of the rear end of the suction head 120 and may cover the outer circumferential surface of the cleaner body 110.

The cover member 129 may be disposed so as to fill at least a portion of the empty space, i.e., the empty space between the cleaner body 110 and the suction head 120. Accordingly, an obstacle may be prevented from being caught in the empty space, or even if an obstacle is caught in the empty space, the robot cleaner 100 may easily avoid the obstacle.

The cover member 129 protruding from the suction head 120 may be supported by the outer circumferential surface of the cleaner body 110. When the cover member 129 protrudes from the cleaner body 110, the cover member 129 may be supported by the rear surface portion of the suction head 120. According to the above structure, when the suction head 120 collides with an obstacle and is shocked thereby, a portion of the shock may be transmitted to the cleaner body 110, and thus the shock may be dispersed.

The suction head 120 may be detachably coupled to the cleaner body 110. When the suction head 120 is separated from the cleaner body 110, a mop (not shown) may replace the separated suction head 120, and may be detachably coupled to the cleaner body 110.

Accordingly, when a user intends to remove dust from the floor, the user may install the suction head 120 on the cleaner body 110, and when the user intends to wipe the floor, the user may install the mop on the cleaner body 110.

The embodiment may further include a liquid detection sensor configured to detect a liquid. The liquid detection sensor may be disposed at the front lower end of the suction head 120 to quickly detect a liquid, thereby preventing the liquid from being suctioned into the suction head 120 and preventing the cleaner body 110 from traveling over the liquid.

The liquid detection sensor may include any of various configurations for detecting a liquid. In one example, the liquid detection sensor may include a humidity sensor. The humidity sensor may be implemented as an electrical-resistance-type humidity sensor or a capacitance-type humidity sensor.

In another example, the liquid detection sensor may detect a liquid using a principle in which electrical resistance changes when a detector (not shown) contacts water. The detector of the liquid detection sensor may preferably be disposed at the front lower end of the suction head 120.

In still another example, the liquid detection sensor may include a resistance wire and a conductive wire, and may detect a liquid by detecting the occurrence of a short in the resistance wire or the conductive wire due to the conductivity of the liquid.

When the suction head 120 is installed to the cleaner body 110, the installation may be guided by the aforementioned cover member 129. That is, the cover member 129 may be disposed so as to cover the outer circumferential surface of the cleaner body 110, and thus the position of the suction head 120 relative to the cleaner body 110 may be determined.

The suction head 120 may be provided with a caster 123. The caster 123 may be configured to assist driving of the robot cleaner 100 and to support the robot cleaner 100. The sensor 130 may be disposed on the cleaner body 110. As illustrated, the sensor 130 may be disposed on the side of the cleaner body 110 on which the suction head 120 is disposed, i.e., on the front side of the cleaner body 110.

The sensor 130 may be disposed so as to overlap the suction head 120 in the upward-and-downward direction of the cleaner body 110. The sensor 130 may be disposed on the suction head 120 and may detect a forward obstacle, a geographic feature, or the like to prevent the suction head 120 positioned at the foremost side of the robot cleaner 100 from colliding with the obstacle.

The sensor 130 may be configured to additionally perform other sensing functions in addition to such a detection function. For example, the sensor 130 may include a camera for acquiring an image of the surroundings. The camera may include a lens and an image sensor. The camera may convert the image of the surroundings of the cleaner body 110 into an electrical signal that is capable of being processed by the controller 1800, and may transmit an electrical signal corresponding to, for example, an upward image to the controller 1800. The electrical signal corresponding to the upward image may be used for the detection of the position of the cleaner body 110 by the controller 1800.

In addition, the sensor 130 may detect an obstacle, such as a wall, furniture, or a cliff, present on the surface on which the robot cleaner 100 is traveling or in the route along which the robot cleaner 100 is traveling. In addition, the sensor 130 may detect the presence of a docking device for charging the battery. In addition, the sensor 130 may detect information about the ceiling and may map a travel area or a cleaning area of the robot cleaner 100.

The dust collector 140, configured to separate and collect dust from the suctioned air, may be detachably coupled to the cleaner body 110. The dust collector 140 may be provided with a dust collector cover 150 configured to cover the dust collector 140. In one embodiment, the dust collector cover 150 may be rotatably hinged to the cleaner body 110. The dust collector cover 150 may be secured to the dust collector 140 or the cleaner body 110 and may be maintained in the state of covering the top surface of the dust collector 140. In the state of covering the top surface of the dust collector 140, the dust collector cover 150 may prevent the dust collector 140 from being separated from the cleaner body 110.

A portion of the dust collector 140 may be contained in a dust collector container, and another portion of the dust collector 140 may protrude in the backward direction of the cleaner body 110 (i.e., a reserve direction R, opposite the forward direction F).

The dust collector 140 may have an entrance formed therein to allow air containing dust to be introduced thereinto and an exit formed therein to allow air from which dust has been removed to be discharged therefrom. When the dust collector 140 is installed in the cleaner body 110, the entrance and the exit may communicate with the cleaner body 110 through an opening 155 formed in an internal wall of the cleaner body 110. Accordingly, an intake flow passage and an exhaust flow passage may be formed in the cleaner body 110.

Owing to this connection relationship, air containing dust introduced through the suction head 120 may be introduced into the dust collector 140 via the intake flow passage inside the cleaner body 110, and air and dust may be separated from each other through a filter or a cyclone of the dust collector 140. Dust may be collected in the dust collector 140, and air may be discharged from the dust collector 140 and may be finally discharged to the outside via the exhaust flow passage inside the cleaner body 110 and an exhaust port.

Hereinafter, an embodiment related to components of the robot cleaner 100 will be described with reference to FIG. 4.

The robot cleaner 100 according to an embodiment of the present disclosure may include at least one of a communication interface 1100, an input device 1200, a driver 1300, a sensor 1400, an output device 1500, a power supply 1600, a memory 1700, a controller 1800, a cleaning device 1900, or combinations thereof.

Figure 4:
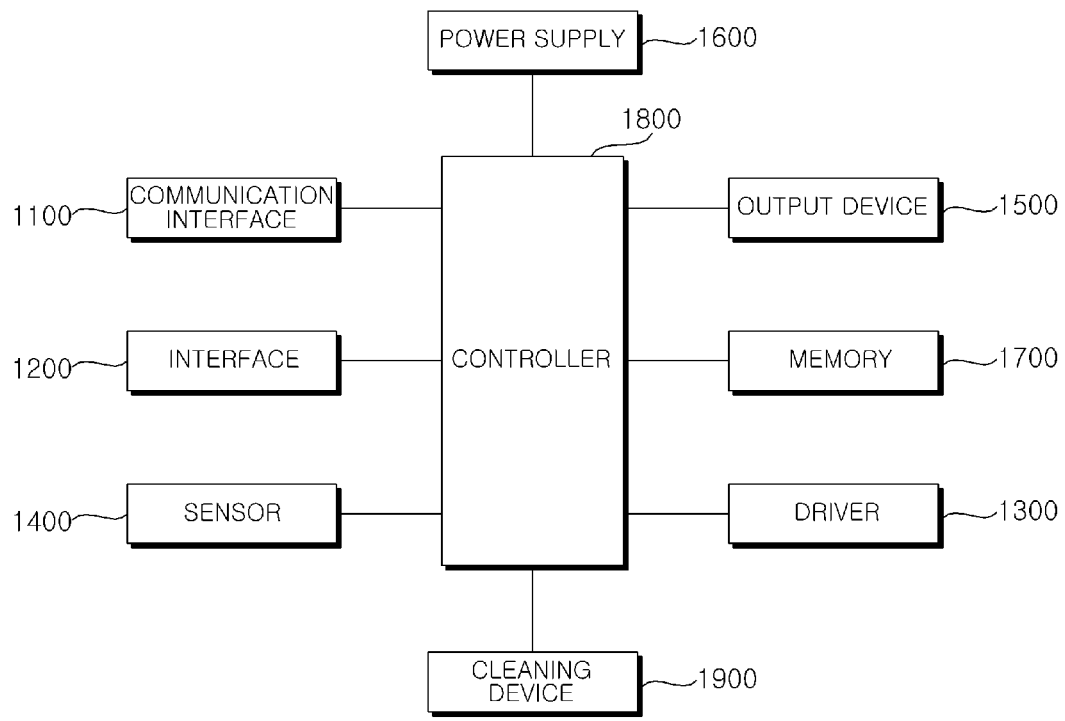
FIG. 4 is a block diagram showing the components of a robot cleaner according to an embodiment of the present disclosure.

The components shown in FIG. 4 are not essential, and a mobile robot including a greater or smaller number of components than those shown in FIG. 4 may be implemented. In addition, as described above, a plurality of robot cleaners described herein may commonly include only some of the components to be described below. That is, respective mobile robots may include different components from each other.

Hereinafter, the components will be described. First, the power supply 1600 may include a battery that is rechargeable by an external commercial power source and may supply power to the mobile robot. The power supply 1600 may supply driving power to each component included in the mobile robot and may supply operating power required to drive the mobile robot or to perform a specific function.

In this case, the controller 1800 may detect the remaining power of the battery. When the remaining power of the battery is insufficient, the controller 1800 may control the mobile robot to move to a charging station connected to the external commercial power source so that the battery is charged with charging current received from the charging station. The battery may be connected to a battery SoC detection sensor, and information on the remaining power and the state of charge (SoC) of the battery may be transmitted to the controller 1800. The output device 1500 may display the remaining power of the battery under the control of the controller 1800.

The battery may be disposed on the lower side of the center of the mobile robot or may be disposed on one of left and right sides of the mobile robot. In the latter case, the mobile robot may further include a balance weight in order to resolve weight imbalance due to the battery.

The controller 1800 may serve to process information on the basis of artificial-intelligence technology, and may include at least one module performing at least one of learning of information, inference of information, perception of information, or processing of a natural language.

The controller 1800 may perform at least one of learning, inferring, or processing a huge amount of information (big data), such as information stored in the cleaner, environment information about a mobile terminal, and information stored in a communication-capable external storage, using machine-learning technology.

In addition, the controller 1800 may predict (or infer) one or more executable operations of the cleaner using information learned using the machine-learning technology, and may control the cleaner to execute an operation having the highest possibility of realization among the one or more predicted operations. The machine-learning technology is technology for collecting and learning a huge amount of information on the basis of at least one algorithm and determining and predicting information on the basis of the learned information.

Learning of information is an operation of recognizing features, rules, determination criteria, and the like of information, quantifying the relationships between pieces of information, and predicting new data using a quantified pattern.

An algorithm used in the machine-learning technology may be an algorithm based on statistics, and may be, for example, a decision tree using a tree structure form as a prediction model, a neural network imitating a neural network structure and function of living things, generic programming based on an evolution algorithm of living things, clustering distributing observed examples to subsets called communities, a Monte Carlo method calculating a function value as a probability through a randomly extracted random number, and the like.

Deep-learning technology, which is one field of machine-learning technology, is technology of performing at least one of learning, determining, or processing information using a deep neural network (DNN) algorithm. The DNN may have a structure of connecting layers and transmitting data between the layers. Such deep-learning technology may enable a huge amount of information to be learned through the DNN using a graphic processing unit (GPU) optimized for parallel arithmetic calculations.

The controller 1800 may be equipped with a learning engine, which detects features for recognizing a specific object using training data stored in an external server or memory. Here, the features for recognizing an object may include the size, shape, shadow, and the like of the object.

In detail, when the controller 1800 inputs a portion of an image obtained through a camera provided on the cleaner to the learning engine, the learning engine may recognize at least one object or living thing included in the input image. In more detail, the controller 1800 may recognize an artificial mark through any of various methods among the recognized objects.

Here, the artificial mark may include a figure, a symbol, and the like, which is made artificially. The artificial mark may include at least two line segments. Specifically, the artificial mark may include a combination of two or more straight lines and curved lines. Preferably, the artificial mark may have a polygonal shape, a star shape, a shape corresponding to the specific external appearance of an object, or the like. The size of the artificial mark may be smaller than the size of a wall of a ceiling. Preferably, the size of the artificial mark may be 1% to 5% of the size of a wall or a ceiling.

In detail, the controller 1800 may analyze images collected from the cleaning area, may determine an immovable figure among the collected images, and may specify at least one of the figures determined to be immovable as an artificial mark. The immovable figure may be a figure marked on an immovable object. This process of recognizing a figure marked on an immovable object as an artificial mark may help prevent mismatch between obstacle maps, which may be caused by movement of an artificial mark.

In addition, the controller 1800 may analyze images collected from the cleaning area and may specify at least one of the figures determined to be marked on a wall or a ceiling among the collected images as an artificial mark.

In this manner, when the learning engine is applied to travel of the cleaner, the controller 1800 may recognize whether an obstacle such as the legs of a chair, a fan, or a gap in a balcony having a specific form, which obstructs the travel of the cleaner, is present near the cleaner, thereby increasing the efficiency and reliability of travel of the cleaner.

The aforementioned learning engine may be installed in the controller 1800, or may be installed in an external server. When the learning engine is installed in an external server, the controller 1800 may control the communication interface 1100 to transmit at least one image as an analysis target to the external server.

The external server may input an image received from the cleaner to the learning engine, and may recognize at least one object or living thing included in the corresponding image. In addition, the external server may transmit information related to the recognition result to the cleaner. Here, the information related to the recognition result may include information related to the number of objects included in the image as an analysis target and the name of each object.

The driver 1300 may include a motor, and may drive the motor to rotate left and right main wheels in both directions such that the main body is capable of moving or rotating. In this case, the left and right main wheels may be driven independently. The driver 1300 may enable the main body of the mobile robot to move in the forward, backward, leftward, or rightward direction, to move along a curved route, or to rotate in place.

The input device 1200 may receive various control commands regarding the mobile robot from a user. The input device 1200 may include one or more buttons, for example, a verification button, a setting button, and the like. The verification button may be a button for receiving a command for checking detection information, obstacle information, position information, and map information from the user, and the setting button may be a button for receiving, from the user, a command for setting the aforementioned pieces of information.

In addition, the input device 1200 may include an input reset button for canceling a previous user input and receiving new user input, a delete button for deleting previous user input, a button for setting or changing an operation mode, and a button for receiving a command for returning to the charging station.

In addition, the input device 1200 may be implemented as a hard key, a soft key, a touch pad, or the like, and may be installed on an upper portion of the mobile robot. In addition, the input device 1200 may have the form of a touch screen along with the output device 1500.

The output device 1500 may be installed on the upper portion of the mobile robot. The installation position or the installation type of the output device 1500 may vary. For example, the output device 1500 may display the SoC of the battery or the driving mode of the mobile robot on a screen.

In addition, the output device 1500 may output information on the state of the interior of the mobile robot detected by the sensor 1400, for example, the current state of each component included in the mobile robot. In addition, the output device 1500 may display external state information, obstacle information, position information, map information, and the like detected by the sensor 1400 on the screen.

The output device 1500 may be implemented as any one of a light-emitting diode (LED), a liquid crystal display (LCD), a plasma display panel (PDP), and an organic light-emitting diode (OLED).

The output device 1500 may further include a sound output device, which audibly outputs an operation process or an operation result of the mobile robot performed by the controller 1800. For example, the output device 1500 may output a warning sound to the outside in response to a warning signal generated by the controller 1800.

In this case, the sound output device (not shown) may be a device configured to output a sound, for example, a beeper, a speaker, or the like. The output device 1500 may output audio data or message data having a predetermined pattern stored in the memory 1700 through the sound output device.

Thus, the mobile robot according to an embodiment of the present disclosure may output environment information regarding a traveling region on the screen, or may output the same as a sound through the output device 1500. According to another embodiment, the mobile robot may transmit map information or environment information to a terminal device through the communication interface 1100 such that the terminal device outputs a screen or a sound to be output through the output device 1500.

The memory 1700 may store a control program for controlling or driving the mobile robot and data corresponding thereto. The memory 1700 may store audio information, image information, obstacle information, position information, map information, and the like. In addition, the memory 1700 may store information related to a traveling pattern.

As the memory 1700, non-volatile memory may be mainly used. Here, the non-volatile memory (NVM) (or NVRAM) may be a storage device capable of continuously maintaining stored information even though power is not supplied thereto. For example, the memory 1700 may be a ROM, a flash memory, a magnetic computer storage device (e.g., a hard disk, a disk drive, or a magnetic tape), an optical disk drive, a magnetic RAM, a PRAM, or the like.

The sensor 1400 may include at least one of an external signal detection sensor, a front detection sensor, a cliff sensor, a two-dimensional (2D) camera sensor, a liquid detection sensor, or a three-dimensional (3D) camera sensor.

The external signal detection sensor may detect an external signal of the mobile robot. The external signal detection sensor may be, for example, an infrared sensor, an ultrasonic sensor, a radio frequency (RF) sensor, or the like.

The mobile robot may verify the position and direction of the charging station upon receiving a guide signal generated by the charging station using the external signal detection sensor. Here, the charging station may transmit the guide signal indicating the direction and the distance such that the mobile robot returns to the charging station. That is, upon receiving the signal transmitted from the charging station, the mobile robot may determine the current position thereof, and may set a movement direction to return to the charging station.

The front detection sensor may be provided in a plural number such that the front detection sensors are installed at regular intervals on the front side of the mobile robot, specifically, along the outer circumference of the side surface of the mobile robot. The front detection sensor may be disposed on at least one side surface of the mobile robot to detect an obstacle ahead. The front detection sensor may detect an object, in particular, an obstacle, present in the movement direction of the mobile robot, and may transmit detection information to the controller 1800. That is, the front detection sensor may detect a protrusion, furnishings, furniture, a wall surface, a wall corner, or the like present in a route along which the mobile robot moves, and may transmit corresponding information to the controller 1800.

The front detection sensor may be, for example, an infrared sensor, an ultrasonic sensor, an RF sensor, a geomagnetic sensor, or the like. The mobile robot may use one type of sensor as the front detection sensor, or may use two or more types of sensors together as the front detection sensor as needed.

For example, in general, the ultrasonic sensor may mainly be used to detect an obstacle in a remote area. The ultrasonic sensor may include a transmitter and a receiver. The controller 1800 may determine whether an obstacle is present based on whether an ultrasonic wave radiated from the transmitter is reflected by an obstacle or the like and received by the receiver, and may calculate the distance to the obstacle using an ultrasonic wave radiation time and an ultrasonic wave reception time.

In addition, the controller 1800 may detect information related to the size of an obstacle by comparing an ultrasonic wave radiated from the transmitter with an ultrasonic wave received by the receiver. For example, when a larger magnitude of ultrasonic wave is received by the receiver, the controller 1800 may determine that the size of the obstacle is larger.

In one embodiment, a plurality of ultrasonic sensors (e.g., five ultrasonic sensors) may be installed on the outer circumferential surface of the front side of the mobile robot. In this case, preferably, the transmitters and the receivers of the ultrasonic sensors may be installed alternatingly on the front surface of the mobile robot.

That is, the transmitters may be disposed so as to be spaced apart from each other in the leftward-and-rightward direction with respect to the center of the front surface of the main body of the mobile robot, and one or two or more transmitters may be provided between the receivers to form a reception region of an ultrasonic signal reflected from the obstacle or the like. Due to this disposition, a reception region may be expanded while reducing the number of sensors. The angle at which the ultrasonic wave is radiated may be maintained at an angle within a range within which other signals are not affected, thereby preventing a crosstalk phenomenon. In addition, the reception sensitivities of the receivers may be set to be different from each other.

In addition, the ultrasonic sensors may be installed so as to be oriented upwards at a predetermined angle such that the ultrasonic waves radiated from the ultrasonic sensors are output upwards. In this case, in order to prevent the ultrasonic waves from being radiated downwards, a blocking member may be further provided.

As mentioned above, two or more types of sensors may be used together as the front detection sensors. In this case, one or more types of sensors among an infrared sensor, an ultrasonic sensor, and an RF sensor may be used as the front detection sensors.

In one example, the front detection sensor may include an infrared sensor as a different type of sensor, in addition to the ultrasonic sensor. The infrared sensor may be installed on the outer circumferential surface of the mobile robot together with the ultrasonic sensor. The infrared sensor may also detect an obstacle present ahead of or beside the mobile robot and may transmit corresponding obstacle information to the controller 1800. That is, the infrared sensor may detect a protrusion, furnishings, furniture, a wall surface, a wall corner, or the like present in a route along which the mobile robot moves, and may transmit corresponding information to the controller 1800. Thus, the mobile robot may move within a cleaning area without colliding with an obstacle.

Various types of optical sensors may be mainly used as the cliff sensor. The cliff sensor may detect an obstacle on the floor supporting the main body of the mobile robot. The cliff sensor may be installed on the rear surface of the mobile robot. However, the cliff sensor may be installed at different positions depending on the type of the mobile robot.

The cliff sensor may be disposed on the rear surface of the mobile robot to detect an obstacle on the floor. The cliff sensor may be an infrared sensor including a light transmitter and a light receiver, an ultrasonic sensor, an RF sensor, a position sensitive detection (PSD) sensor, or the like, like the obstacle detection sensor.

In one example, any one of cliff sensors may be installed on the front side of the mobile robot, and the other two cliff sensors may be installed on a relatively rear side of the mobile robot. For example, the cliff sensor may be a PSD sensor, or may include a plurality of different types of sensors.

The PSD sensor detects the positions of the short and long distances of incident light with a single p-n junction using the surface resistance of a semiconductor. The PSD sensor may be classified into a one-dimensional (1D) PSD sensor that detects light on a single axis and a 2D PSD sensor that detects the position of light on a plane. Both the 1D PSD sensor and the 2D PSD sensor may have a pin photodiode structure. The PSD sensor is a type of infrared sensor that transmits an infrared ray to an obstacle and measures the angle between the infrared ray transmitted to the obstacle and the infrared ray returning thereto after being reflected from the obstacle, thus measuring the distance to the obstacle. That is, the PSD sensor calculates the distance to an obstacle using triangulation.

The PSD sensor may include a light transmitter configured to emit an infrared ray to an obstacle and a light receiver configured to receive an infrared ray returning thereto after being reflected from the obstacle. In general, the PSD sensor is formed as a module. In the case in which an obstacle is detected using the PSD sensor, a consistent measurement value may be obtained regardless of differences in reflectivity or the color of obstacles.

The cleaning device 1900 may clean the designated cleaning area in response to a control command transmitted from the controller 1800. The cleaning device 1900 may scatter surrounding dust through a brush (not shown) that scatters dust in the designated cleaning area and may then drive a suction fan and a suction motor to suction the scattered dust. In addition, the cleaning device 1900 may mop the designated cleaning area according to the replacement of the cleaning tool.

The controller 1800 may measure the angle between an infrared ray radiated toward the floor from the cliff sensor and an infrared ray received by the cliff sensor after being reflected from an obstacle to detect a cliff, and may analyze the depth of the cliff.

The controller 1800 may determine the state of a cliff detected by the cliff sensor and may determine whether the mobile robot is capable of passing over the cliff based on the result of determining the state of the cliff. In one example, the controller 1800 may determine the presence or absence of a cliff and the depth of a cliff using the cliff sensor and may allow the mobile robot to pass over the cliff only when the cliff sensor senses a reflection signal. In another example, the controller 1800 may determine whether the mobile robot is being lifted using the cliff sensor.

The 2D camera sensor may be provided on one surface of the mobile robot and may obtain image information related to the surroundings of the main body during movement. An optical flow sensor may convert an image of the lower side input from an image sensor provided therein to generate image data in a predetermined format. The generated image data may be stored in the memory 1700.

In addition, one or more light sources may be installed adjacent to the optical flow sensor. The one or more light sources may radiate light to a predetermined region of the floor that is photographed by the image sensor. When the mobile robot moves a specific region on the floor, if the floor is flat, a uniform distance may be maintained between the image sensor and the floor.

On the other hand, in the case in which the mobile robot moves on a floor that is uneven, the image sensor may become distant from the floor by a predetermined distance or more due to depressions and protrusions in the floor and obstacles on the floor. In this case, the controller 1800 may control the one or more light sources to adjust the amount of light radiated therefrom. The light sources may be light-emitting devices, for example, light-emitting diodes (LEDs), which are capable of adjusting the amount of light.

The controller 1800 may detect the position of the mobile robot using the optical flow sensor regardless of slippage of the mobile robot. The controller 1800 may compare and analyze image data captured by the optical flow sensor over time to calculate a movement distance and a movement direction, and may calculate the position of the mobile robot based thereon. By using the image information regarding the lower side of the mobile robot using the optical flow sensor, the controller 1800 may perform correction resistant to slippage with respect to the position of the mobile robot, which is calculated by other devices.

The 3D camera sensor may be attached to one surface or a portion of the main body of the mobile robot, and may generate 3D coordinate information related to the surroundings of the main body. For example, the 3D camera sensor may be a 3D depth camera configured to calculate the distance between the mobile robot and a target to be photographed.

In detail, the 3D camera sensor may capture a 2D image related to the surroundings of the main body and may generate a plurality of pieces of 3D coordinate information corresponding to the captured 2D image.

In one embodiment, the 3D camera sensor may be of a stereovision type. That is, the 3D camera sensor may include two or more typical cameras obtaining 2D images and may combine two or more images obtained by the two or more cameras to generate 3D coordinate information.

In detail, the 3D camera sensor according to the embodiment may include a first pattern transmitter configured to radiate light having a first pattern downwards toward a region ahead of the main body, a second pattern transmitter configured to radiate light having a second pattern upwards toward a region ahead of the main body, and an image obtainer configured to obtain a forward image of the main body. Accordingly, the image obtainer may obtain an image of a region on which the light having a first pattern and the light having a second pattern are incident.

In another embodiment, the 3D camera sensor may include a single camera and an infrared pattern transmitter configured to radiate an infrared pattern, and may measure the distance between the 3D camera sensor and a target to be photographed by capturing a shape in which an infrared pattern radiated from the infrared pattern transmitter is projected onto the target to be photographed. This 3D camera sensor may be an infrared-type 3D camera sensor.

In still another embodiment, the 3D camera sensor may include a single camera and a light emitter configured to emit a laser beam, and may measure the distance between the 3D camera sensor and a target to be photographed by receiving a portion of the laser beam reflected from the target to be photographed after being emitted from the light emitter and analyzing the received laser beam. This 3D camera sensor may be a time-of-flight (ToF)-type 3D camera sensor.

In detail, the above 3D camera sensor may be configured to radiate a laser beam in a form extending in at least one direction. In one example, the 3D camera sensor may include first and second lasers such that the first laser radiates linear laser beams intersecting each other and the second laser radiates a single linear laser beam. According to this, the lowermost laser beam may be used to detect an obstacle located at a lower region, the uppermost laser beam may be used to detect an obstacle located at an upper region, and the intermediate laser beam between the lowermost laser beam and the uppermost laser beam may be used to detect an obstacle located at an intermediate region.

The sensor 1400 may collect information on an artificial mark within a cleaning area. In detail, the 2D or 3D camera sensor may collect an image including information on an artificial mark within a cleaning area.

The communication interface 1100 may be connected to a terminal device and/or another device present within a specific region (which will be interchangeably used with the term "home appliance" in this specification) in any one of wired, wireless, and satellite communication schemes to exchange signals and data therewith.

The communication interface 1100 may transmit and receive data to and from another device present within a specific region. Here, the other device may be any device, as long as it is capable of transmitting and receiving data over a network. For example, the other device may be an air conditioner, a heater, an air purifier, a lamp, a TV, a vehicle, or the like. Alternatively, the other device may be a device for controlling a door, a window, a water valve, a gas valve, or the like. Alternatively, the other device may be a sensor for sensing temperature, humidity, atmospheric pressure, gas, or the like.

In addition, the communication interface 1100 may communicate with another robot cleaner 100 present within a specific region or within a predetermined range.

Figure 5A:
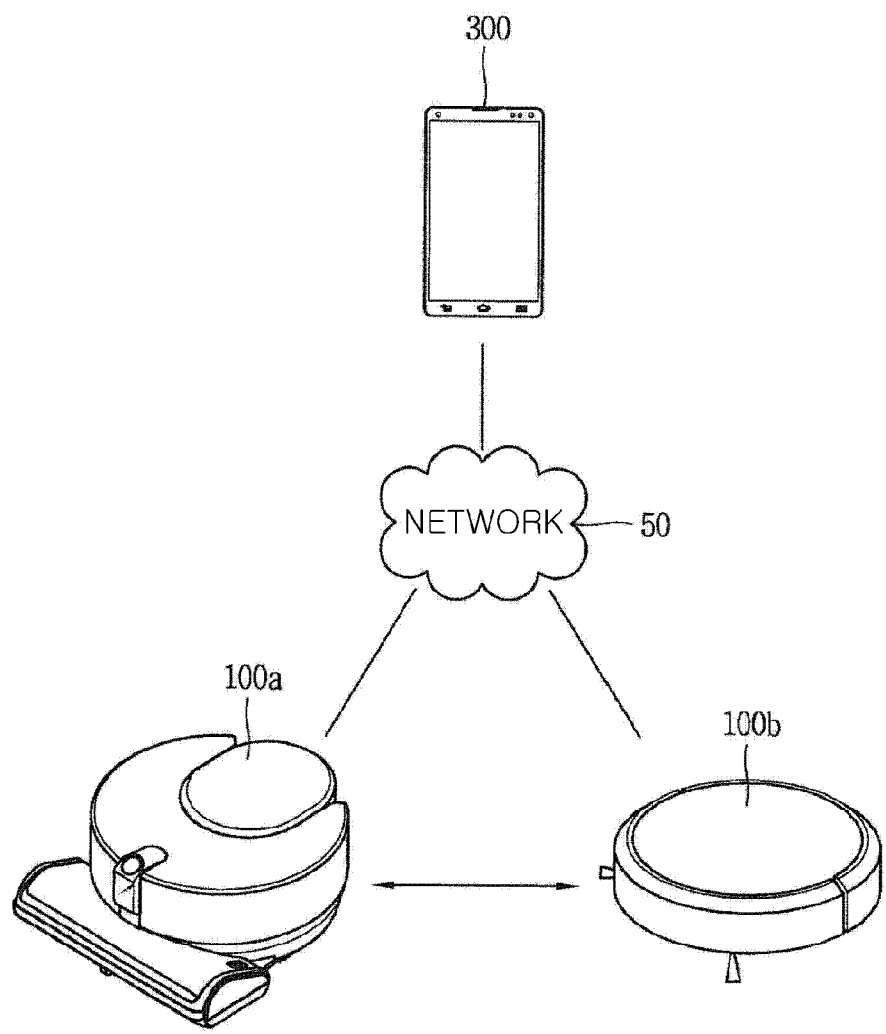
FIG. 5A is a conceptual view showing network communication between a plurality of robot cleaners according to an embodiment of the present disclosure.
Figure 5B:
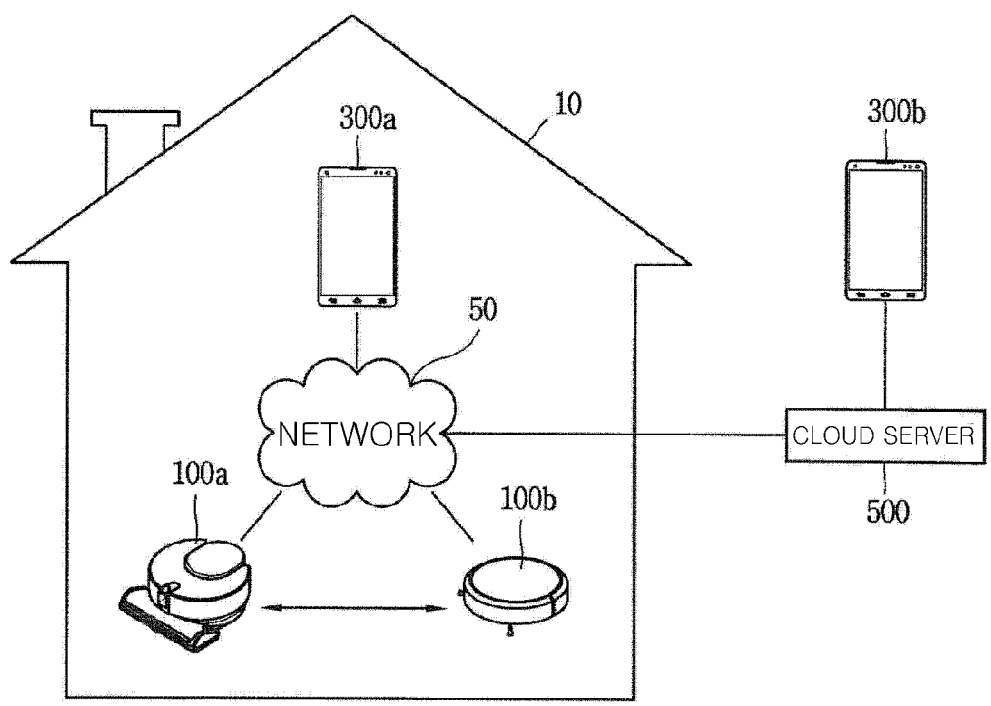
FIG. 5B is a conceptual view showing an example of the network communication shown in FIG. 5A.

Referring to FIGS. 5A and 5B, a first mobile robot 100*a* and a second mobile robot 100*b*, which autonomously travel, may exchange data with each other through a network communication device 50. In addition, the first mobile robot 100*a* and/or the second mobile robot 100*b*, which autonomously travel, may perform cleaning-related operations or operations corresponding thereto in response to a control command received from a terminal 300 through the network communication device 50 or another communication scheme.

Although not shown in the drawings, a plurality of mobile robots 100*a* and 100*b*, which autonomously travel, may communicate with the terminal 300 through the first network communication and may communicate with each other through the second network communication.

Here, the network communication device 50 may be a short-range communication device using at least one wireless communication technology selected from among Wireless LAN (WLAN), Wireless Personal Area Network (WPAN), Wireless-Fidelity (Wi-Fi), Wireless-Fidelity (Wi-Fi) Direct, Digital Living Network Alliance (DLNA), Wireless Broadband (WiBro), World Interoperability for Microwave Access (WiMAX), ZigBee, Z-wave, Bluetooth, Radio Frequency Identification (RFID), Infrared Data Association (IrDA), Ultra-Wide Band (UWB), and Wireless Universal Serial Bus (Wireless USB).

The illustrated network communication device 50 may vary depending on the communication scheme through which the mobile robots communicate with each other.

Referring to FIG. 5A, the first mobile robot 100a and/or the second mobile robot 100b, which autonomously travel, may transmit information sensed by the sensor thereof to the terminal 300 through the network communication device 50. The terminal 300 may transmit a control command generated based on the received information to the first mobile robot 100a and/or the second mobile robot 100b through the network communication device 50.

In addition, referring to FIG. 5A, the communication interface of the first mobile robot 100a and the communication interface of the second mobile robot 100b may directly or indirectly wirelessly communicate with each other through a router (not shown), thereby exchanging information regarding the traveling states and positions thereof.

In one example, the second mobile robot 100b may perform traveling and cleaning operations in response to a control command received from the first mobile robot 100a. In this case, it can be said that the first mobile robot 100a serves as a master and the second mobile robot 100b serves as a slave.

Alternatively, it can be said that the second mobile robot 100b follows the first mobile robot 100a. Alternatively, in some cases, it can be said that the first mobile robot 100a and the second mobile robot 100b cooperate with each other.

Hereinafter, a system including a plurality of mobile robots 100a and 100b configured to autonomously travel according to an embodiment of the present disclosure will be described with reference to FIG. 5B.

Referring to FIG. 5B, a cleaning system according to an embodiment of the present disclosure may include a plurality of mobile robots 100a and 100b, which autonomously travel, a network communication device 50, a server 500, which may be a cloud server, and a plurality of terminals 300a and 300b.

Among them, the mobile robots 100a and 100b, the network communication device 50, and at least one terminal 300a may be disposed in a building 10, and the other terminal 300b and the server 500 may be disposed outside the building 10.

Each of the mobile robots 100a and 100b may be a cleaner that is capable of autonomously performing cleaning while autonomously traveling. Each of the mobile robots 100a and 100b may include a communication interface 1100 in addition to components for performing the traveling function and the cleaning function.

The mobile robots 100a and 100b, the server 500, and the terminals 300a and 300b may be connected to each other through the network communication device 50 and may exchange data with each other. To this end, although not illustrated, a wireless router such as an access point (AP) device may be further provided. In this case, the terminal 300a located in the internal network may be connected to at least one of the mobile robots 100a and 100b through the AP device and may monitor and remotely control the cleaner. In addition, the terminal 300b located in the external network may also be connected to at least one of the mobile robots 100a and 100b through the AP device and may monitor and remotely control the cleaner.

The server 500 may be directly wirelessly connected to the mobile terminal 300b. Alternatively, the server 500 may be connected to at least one of the mobile robots 100a and 100b without using the mobile terminal 300b.

The server 500 may include a processor capable of executing a program and may further include various algorithms. In one example, the server 500 may include an algorithm associated with the performance of machine learning and/or data mining.

In another example, the server 500 may include a voice recognition algorithm. In this case, upon receiving voice data, the server 500 may convert the received voice data into data in a text format and may output the data in a text format.

The server 500 may store firmware information and traveling information (e.g., course information, etc.) about the mobile robots 100a and 100b and may register product information about the mobile robots 100a and 100b. For example, the server 500 may be a server administered by a cleaner manufacturer or a server administered by a publicly accessible application store operator.

In still another example, the server 500 may be a home server that is provided in the internal network 10 to store state information about home appliances or store content shared between the home appliances. When the server 500 is a home server, the server 500 may store information related to foreign substances, for example, images of foreign substances and the like.

The mobile robots 100a and 100b may be directly wirelessly connected to each other through ZigBee, Z-wave, Bluetooth, Ultra-Wide Band, or the like. In this case, the mobile robots 100a and 100b may exchange position information and traveling information thereof with each other.

In this case, any one of the mobile robots 100a and 100b may serve as a master mobile robot (e.g., 100a), and the other one may serve as a slave mobile robot (e.g., 100b). For example, the first mobile robot 100a may be a dry-type cleaner configured to suction dust from the floor to be cleaned, and the second mobile robot 100b may be a wet-type cleaner configured to mop the floor that has been cleaned by the first mobile robot 100a.

In addition, the first mobile robot 100a and the second mobile robot 100b may have different structures and specifications from each other. In this case, the first mobile robot 100a may control the traveling operation and the cleaning operation of the second mobile robot 100b. In addition, the second mobile robot 100b may perform the traveling operation and the cleaning operation while following the first mobile robot 100a. Here, the operation in which the second mobile robot 100b follows the first mobile robot 100a may mean the operation in which the second mobile robot 100b performs cleaning while traveling after the first mobile robot 100a at an appropriate distance away from the first mobile robot 100a.

Figure 5C:
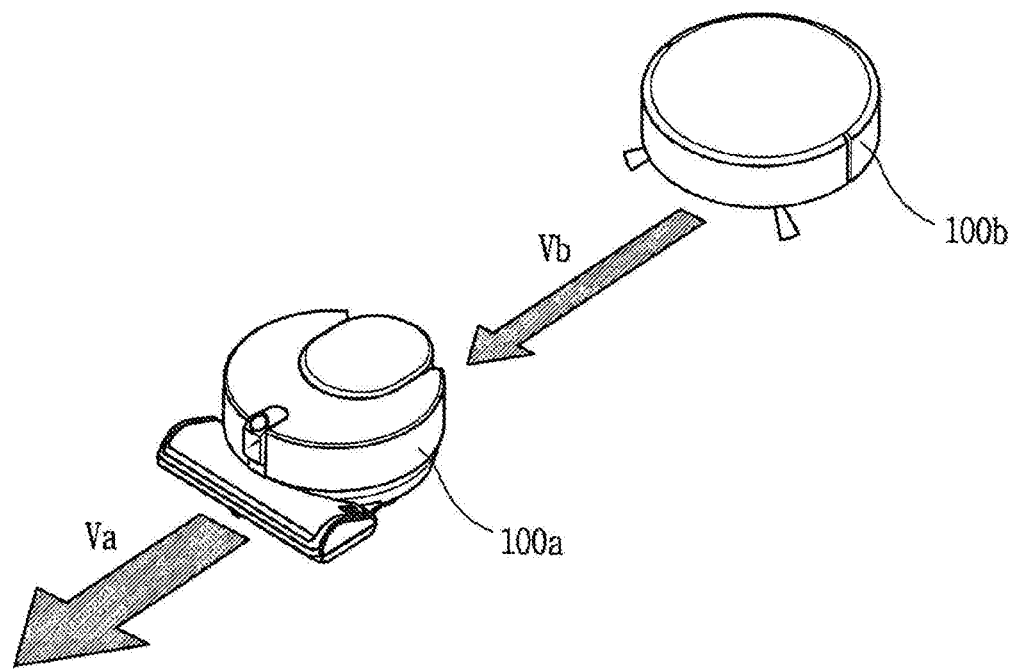
FIG. 5C is a view of a plurality of robot cleaners according to an embodiment of the present disclosure.

Referring to FIG. 5C, the first mobile robot 100a may control the second mobile robot 100b to follow the first mobile robot 100a.

To this end, the first mobile robot 100a and the second mobile robot 100b need to be located within a specific region within which communication therebetween is possible, and the second mobile robot 100b needs to perceive at least the relative position of the first mobile robot 100a.

In one example, the communication interface of the first mobile robot 100a and the communication interface of the second mobile robot 100b may exchange IR signals, ultrasonic signals, carrier frequencies, impulse signals, and the like with each other, and may analyze the same using triangulation to calculate the displacement of the first mobile robot 100a and the second mobile robot 100b, thereby perceiving the positions of the first mobile robot 100a and the second mobile robot 100b relative to each other.

However, the position perception through signal exchange may be realized only when the first mobile robot 100a and the second mobile robot 100b are provided with respective position sensors or are sufficiently close to each other. Therefore, the present disclosure proposes a method of enabling any one of the first mobile robot 100a and the second mobile robot 100b to easily perceive the relative position of the other one within a designated space without separate position sensors and regardless of the distance between the first mobile robot 100a and the second mobile robot 100b.

As such, when the positions of the first mobile robot 100a and the second mobile robot 100b relative to each other are perceived, the second mobile robot 100b may be controlled on the basis of the map information stored in the first mobile robot 100a or the map information stored in the server or the terminal. In addition, the second mobile robot 100b may share the obstacle information sensed by the first mobile robot 100a. In addition, the second mobile robot 100b may operate in response to a control command (a command for controlling travel, for example, a traveling direction, a traveling speed, stop, etc.) received from the first mobile robot 100a.

In detail, the second mobile robot 100b may perform cleaning while traveling along the route along which the first mobile robot 100a has traveled. However, the current direction in which the first mobile robot 100a is traveling and the current direction in which the second mobile robot 100b is traveling are not always the same. This is because, after the first mobile robot 100a moves or turns in the forward, backward, leftward, or rightward direction, the second mobile robot 100b moves or turns in the forward, backward, leftward, or rightward direction a predetermined amount of time later.

In addition, the speed Va at which the first mobile robot 100a travels and the speed Vb at which the second mobile robot 100b travels may be different from each other. The first mobile robot 100a may control the traveling speed Vb of the second mobile robot 100b in consideration of the distance within which communication between the first mobile robot 100a and the second mobile robot 100b is possible.

In one example, when the first mobile robot 100a and the second mobile robot 100b are spaced apart from each other by a predetermined distance or more, the first mobile robot 100a may control the traveling speed Vb of the second mobile robot 100b to be higher than before. In addition, when the first mobile robot 100a and the second mobile robot 100b are close to each other by a predetermined distance or less, the first mobile robot 100a may control the traveling speed Vb of the second mobile robot 100b to be lower than before, or may control the second mobile robot 100b to stop for a predetermined amount of time. Through this, the second mobile robot 100b may perform cleaning while continuously following the first mobile robot 100a.

In addition, although not illustrated, the first mobile robot 100a and the second mobile robot 100b may operate so as to cooperatively clean their own designated spaces. To this end, each of the first mobile robot 100a and the second mobile robot 100b may have an obstacle map, which indicates an obstacle within the designated space that has been cleaned at least once by the corresponding mobile robot and in which the position coordinates of the corresponding mobile robot are marked.

The obstacle map may include information about the region in a specific space (e.g., the shape of the region, the position of a wall, the height of a floor, the position of a door/doorsill, etc.), position information about the cleaner, the position information about the charging station, and information about an obstacle present within the specific space (e.g., the position of an obstacle, the size of an obstacle, etc.). Here, the obstacle may include a fixed obstacle that protrudes from the floor in the cleaning area and obstructs the travel of the cleaner, such as a wall, furniture, or furnishings, a movable obstacle that is moving, and a cliff.

The obstacle map included in the first mobile robot 100a and the obstacle map included in the second mobile robot 100b may be different from each other. For example, when the first mobile robot 100a and the second mobile robot 100b are of different types from each other or include different types of obstacle detection sensors from each other (e.g., an ultrasonic sensor, a laser sensor, a radar sensor, an infrared sensor, a bumper, etc.), different obstacle maps may be generated, even though they are generated with respect to the same space.

The memory 1700 of each of the first mobile robot 100a and the second mobile robot 100b may store an obstacle map, which has been generated in advance with respect to a designated space before performing cooperative cleaning, and map data associated therewith.

Each obstacle map may be implemented in the form of a 2D or 3D image or a grid map of the designated space. In addition, each obstacle map may include information about at least one obstacle (e.g., position information and size information about a table, a wall, a doorsill, or the like), position information about the corresponding mobile robot (i.e., the first mobile robot 100a or the second mobile robot 100b), and position information about a liquid region A1 within the cleaning area.

In addition, each obstacle map may be generated so as to have the same shape as the designated actual space, and may be generated in the same scale as the actual space based on the values measured in the floor plan.

The first mobile robot 100a and the second mobile robot 100b may independently travel and perform cleaning in the respectively designated spaces. However, when the first mobile robot 100a and the second mobile robot 100b separately perform cleaning according to their own scenarios, rather than performing cooperative cleaning, the route along which the first mobile robot 100a travels and the route along which the second mobile robot 100b travels may overlap each other, or various other problems may occur. In this case, it is difficult to accomplish efficient cleaning using a plurality of mobile robots.

Therefore, according to the present disclosure, each of the plurality of mobile robots is configured to perceive the relative position of the other mobile robot within a designated space without a position sensor in order to perform cooperative/following cleaning operation.

In detail, according to the present disclosure, the first mobile robot 100a may communicate with the second mobile robot 100b and may receive an obstacle map, in which the position of the second mobile robot 100b and an artificial mark are marked, from the second mobile robot 100b. Thereafter, the first mobile robot 100a may standardize the coordinate system of the received obstacle map with the coordinate system of the obstacle map thereof through calibration based on the artificial mark in the obstacle map thereof. Thereafter, the first mobile robot 100a may perceive the relative position of the second mobile robot 100b using the obstacle map of the second mobile robot 100b, the coordinate system of which has been standardized. That is, according to the present disclosure, even if the coordinate systems of the obstacle maps of the first and second mobile robots 100*a* and 100*b* are different from each other due to the use of different types of obstacle detection sensors, even if the first mobile robot 100*a* and the second mobile robot 100*b* are spaced apart from each other to an extent to which exchange of a short-range wireless signal therebetween is impossible, or even if the first mobile robot 100*a* and the second mobile robot 100*b* are not provided with position sensors, each of the first mobile robot 100*a* and the second mobile robot 100*b* may perceive the relative position of the other mobile robot within the same space, as long as the first mobile robot 100*a* and the second mobile robot 100*b* have obstacle maps with respect to the same space.

Hereinafter, a control method and a control system of a plurality of robot cleaners according to embodiments of the present disclosure will be described with reference to FIG. 6. The control method may be performed only by the controller 1800, or may be performed by the controller 1800 and the terminal 300 or by the controller 1800 and the server 500 depending on the embodiment. The present disclosure may be a computer program implementing each step of the control method, or may be a recording medium on which a program for implementing the control method is recorded. "Recording medium" means a computer-readable recording medium. The present disclosure may be a system including both hardware and software.

In some embodiments, it is also possible that the functions mentioned in the steps may be performed out of order. For example, the two steps shown in succession may be performed substantially simultaneously, or the steps may sometimes be performed in reverse order according to corresponding functions.

First, in order to perform cooperative cleaning using a plurality of mobile robots, the mobile robots may be grouped in a single group, and an area in which the mobile robots will perform cooperative cleaning may be designated.

Figure 6:
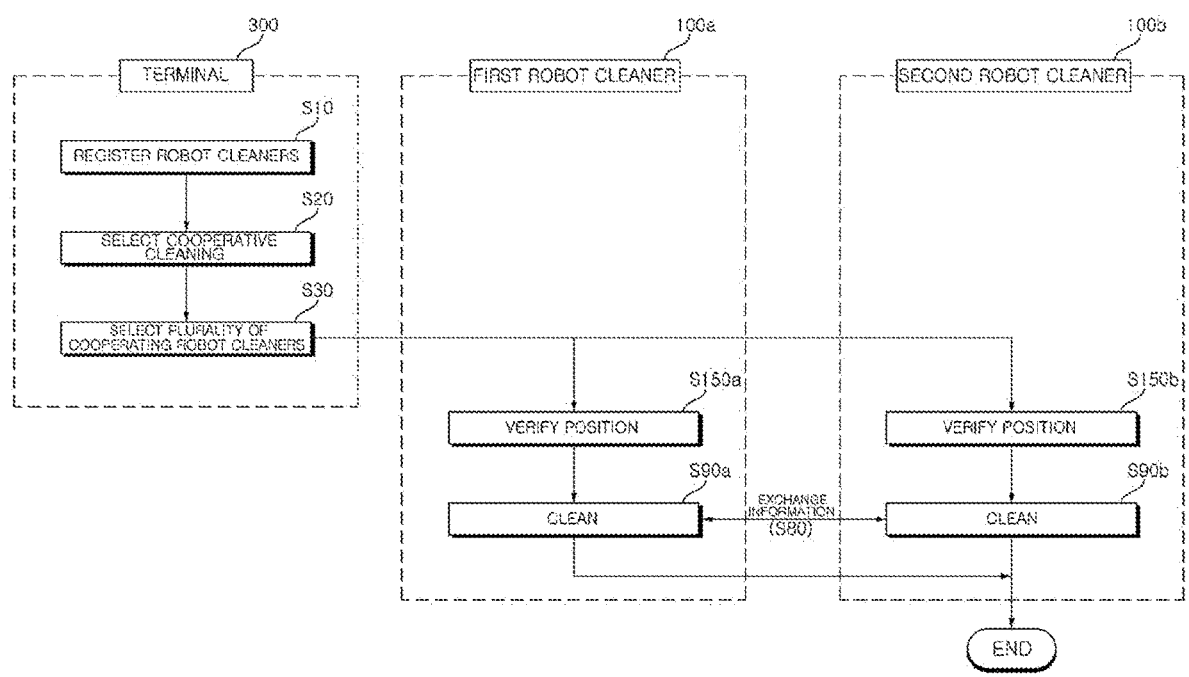
FIG. 6 is a representative flowchart for a cooperative cleaning method of a plurality of robot cleaners according to an embodiment of the present disclosure.

In detail, referring to FIG. 6, a method of controlling a plurality of mobile robots may include a step of registering a plurality of robot cleaners (S10). The control method may further include, after the step S10, a step of receiving selective input of a cooperative cleaning mode by a user (S20). The control method may further include, after the step S20, a step of selecting a plurality of robot cleaners to be used for cooperative cleaning (which may be referred to as "cooperating robot cleaners") and selecting one of a plurality of cooperation modes (S30). The control method may further include a step of performing, by the robot cleaners, cleaning (S90).

In the robot cleaner registration step S10, a plurality of robot cleaners 100*a* and 100*b* may be registered in the terminal 300. The robot cleaners 100*a* and 100*b* may alternatively be registered in the server 500.

The user may register robot cleaners that are connectable in a network by touching a product registration input interface on a screen of the terminal 300. When the product registration is completed, the registered robot cleaners may be displayed on the screen of the terminal 300.

In the cooperative cleaning selection step S20, the user may select a cooperative cleaning mode using the terminal 300. The step S30 may include a robot cleaner selection step S30 of selecting a plurality of cooperating robot cleaners to perform cooperative cleaning among the registered robot cleaners.

For example, the user may select options to input "Robot Cleaner 1" as the first robot cleaner 100*a*. In addition, in the step S30, the user may select the second robot cleaner 100*b* among one or more options on the screen of the terminal 300. For example, the user may select options to input "Robot Cleaner 2 (mop)" as the second robot cleaner 100*b*. In the second embodiment to be described later, the user may select and input only the main robot cleaner among the plurality of cooperating robot cleaners.

The step S30 may include a mode selection step S30 in which one of a plurality of cooperation modes is selected. The user may select, from among a plurality of options, one corresponding to the cooperation mode that the user intends to select.

In the cleaning step S90, the cooperating robot cleaners 100*a* and 100*b* selected in the robot cleaner selection step S30 may perform cleaning. In the cleaning step S90, the robot cleaners 100*a* and 100*b* may perform cleaning according to the cooperation mode selected in the mode selection step S30.

In the robot cleaner selection step S30, the first robot cleaner 100*a* and the second robot cleaner 100*b* may be selected from among a plurality of registered robot cleaners. The first robot cleaner 100*a* and the second robot cleaner 100*b* may be cleaners selected to perform cooperative cleaning. After the step S30, when the terminal 300 gives instructions to the first robot cleaner 100*a* and the second robot cleaner 100*b* through the network, the first robot cleaner 100*a* and the second robot cleaner 100*b* may analyze the current states thereof and may verify the positions thereof on the maps (S150*a* and S150*b*). After verifying the position thereof (S150*a*), the first robot cleaner 100*a* may perform cooperative cleaning together with the second robot cleaner 100*b* (S90*a*). After verifying the position thereof (S150*b*), the second robot cleaner 100*b* may perform cooperative cleaning together with the first robot cleaner 100*a* (S90*b*). The first robot cleaner 100*a* and the second robot cleaner 100*b* may exchange information with each other while performing cleaning (S90*a* and S90*b*) (S80).

Hereinafter, the case in which a liquid is detected in the cleaning area during the cooperative cleaning described above will be described.

Referring to FIGS. 7A-7D and 8, a method of controlling a plurality of robot cleaners according to a first embodiment of the present disclosure may include detecting, by the first mobile robot 100*a*, whether a liquid is present in the cleaning area (S110), upon detecting that a liquid is present, transmitting, by the first mobile robot 100*a*, an obstacle map including position information about a liquid region A1 and a liquid region cleaning command to the second mobile robot 100*b* (S113), upon receiving, by the second mobile robot 100*b*, the liquid region cleaning command (S115), moving the second mobile robot 100*b* to the liquid region A1 (S120), and cleaning, by the second mobile robot 100*b*, the liquid region A1 (S130).

Figure 7A:
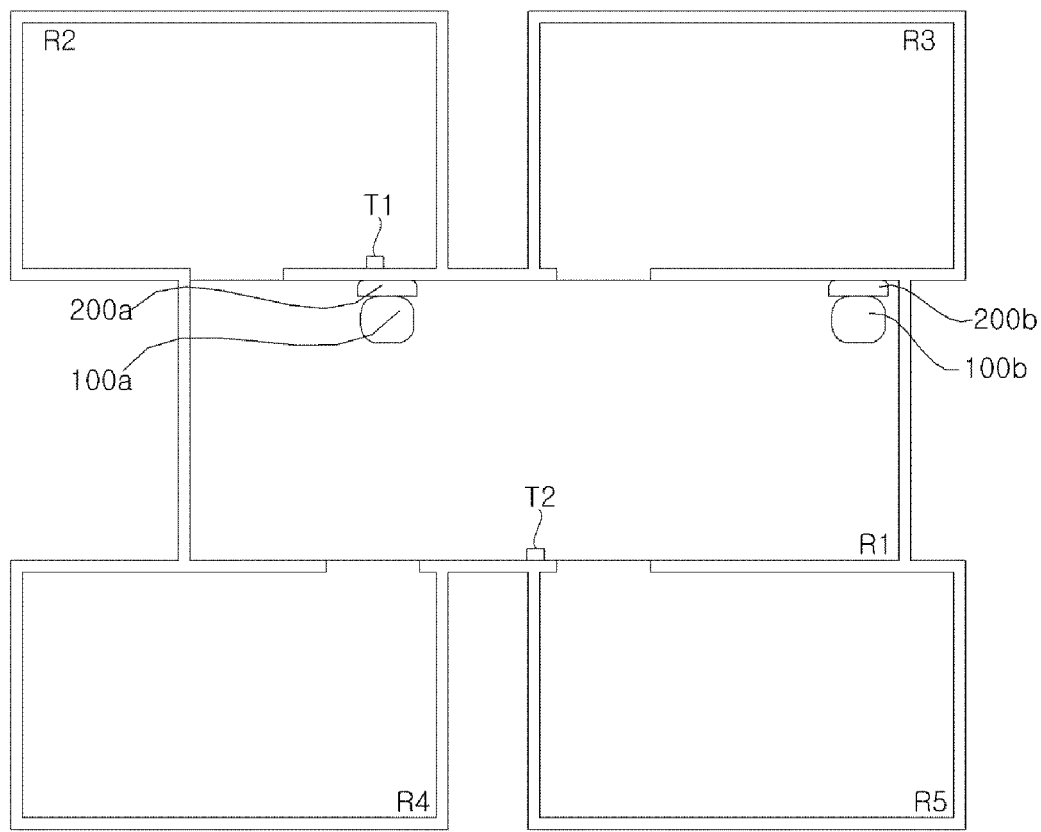
FIGS. 7A-7D are conceptual views showing a cooperative cleaning operation of a plurality of robot cleaners according to an embodiment of the present disclosure.
Figure 7B:
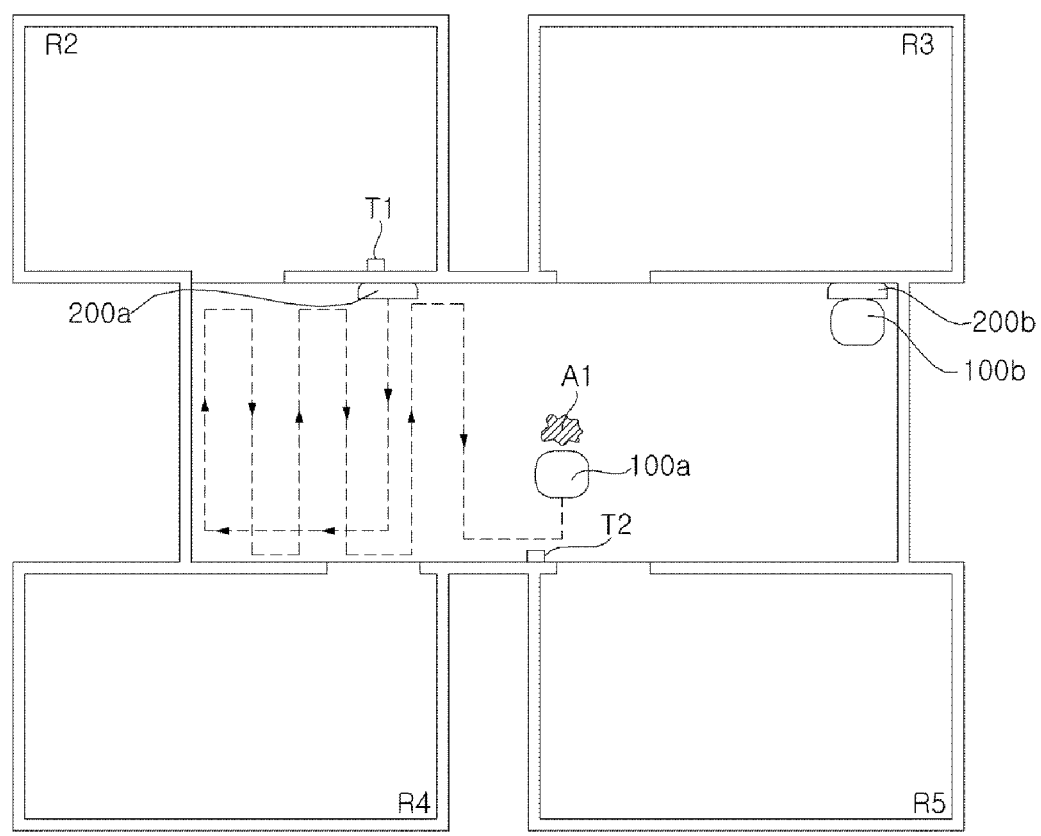
Figure 8:
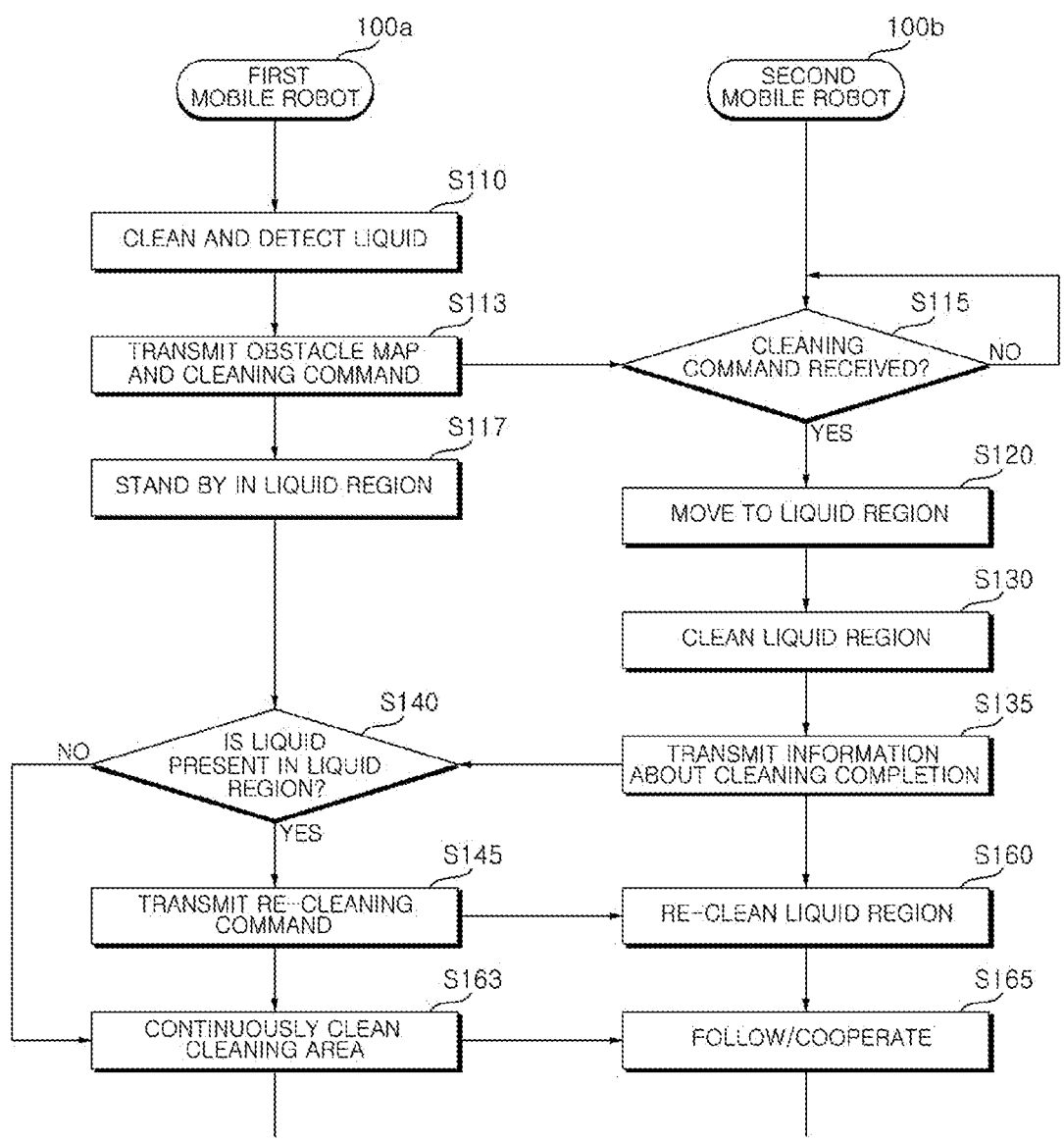
FIG. 8 is a flowchart of a method of controlling a plurality of robot cleaners according to a first embodiment of the present disclosure.

Referring to FIGS. 7A, 7B and 8, in the step S110 in which the first mobile robot 100*a* detects whether a liquid is present in the cleaning area, the first mobile robot 100*a* may perform cleaning and liquid detection simultaneously within the cleaning area. The controller 1800 of the first mobile robot 100*a* may control the driver and the cleaning device to generate an obstacle map of the cleaning area and to detect a liquid.

In detail, in the step S110, when the first mobile robot 100*a* has no map stored therein, for example, at an initial travel stage, the first mobile robot 100*a* may travel the cleaning area and may generate a map by following a wall and/or using detection information from the sensor 130.

The first mobile robot 100*a* may divide the generated map into a plurality of regions R1, R2, R3, R4, R5 and A1, and may further include portions 200*a* and 200*b*. The cleaning area may be divided into a plurality of regions R1, R2, R3, R4, R5 and A1 according to a predetermined algorithm.

In one example, the routes, along each of which the robot cleaner 100 has traveled a predetermined distance, may be grouped into one region.

In another example, the cleaning area may be divided into a plurality of regions based on the partition state thereof. Specifically, the robot cleaner 100 may detect walls of rooms, openable/closeable doors, or the like within the cleaning area, and may divide the cleaning area into a plurality of regions based thereon.

In still another example, the cleaning area may be divided into a plurality of regions on the basis of the area of each of the divided regions. Specifically, the cleaning area may be divided into a plurality of regions, each of which has its own predetermined area, and may define a region in which a liquid is present, among the plurality of regions, as a liquid region A1.

As the method of detecting a liquid by the first mobile robot 100a, an image analysis method using a camera or a method using a liquid detection sensor 1411 may be used.

In the step S113 of transmitting a liquid region cleaning command, the first mobile robot 100a may collect position information about the liquid region A1, and may transmit the position information to the second mobile robot 100b. The position information about the liquid region A1 may include coordinate values of the liquid region A1 on the obstacle map, an image of the surroundings of the liquid region A1, and a received signal strength indicator value between at least one router T1 and T2 and the first mobile robot 100a in the liquid region A1.

Preferably, the position information about the liquid region A1 may be a combination of coordinate values of the liquid region A1 on the obstacle map and at least one of an image of the surroundings of the liquid region A1 or a received signal strength indicator value between at least one router T1 and T2 and the first mobile robot 100a in the liquid region A1. This is because it is difficult to specify the exact position of the liquid region A1 using only coordinate values of the liquid region A1 on the obstacle map.

In the step S120 of moving the second mobile robot 100b to the liquid region A1, the second mobile robot 100b may move to the liquid region A1 upon receiving the liquid region cleaning command and the obstacle map from the first mobile robot 100a (S115).

Figure 7C:
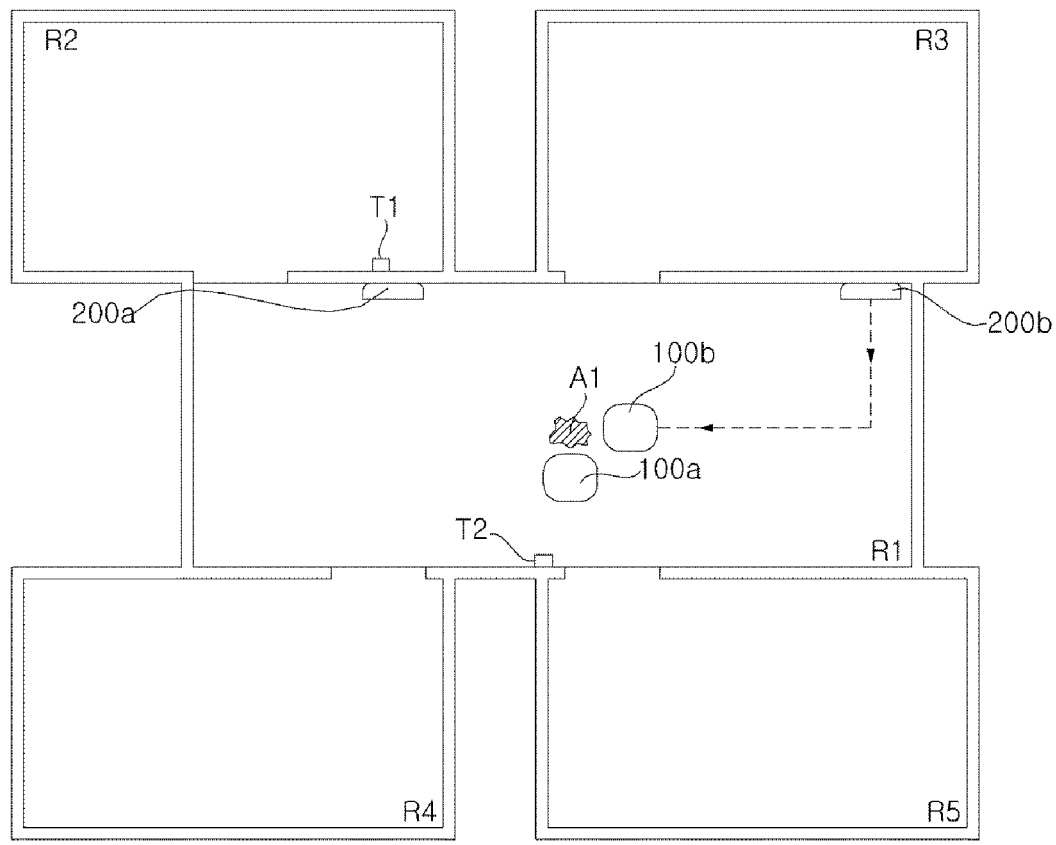
Figure 7D:
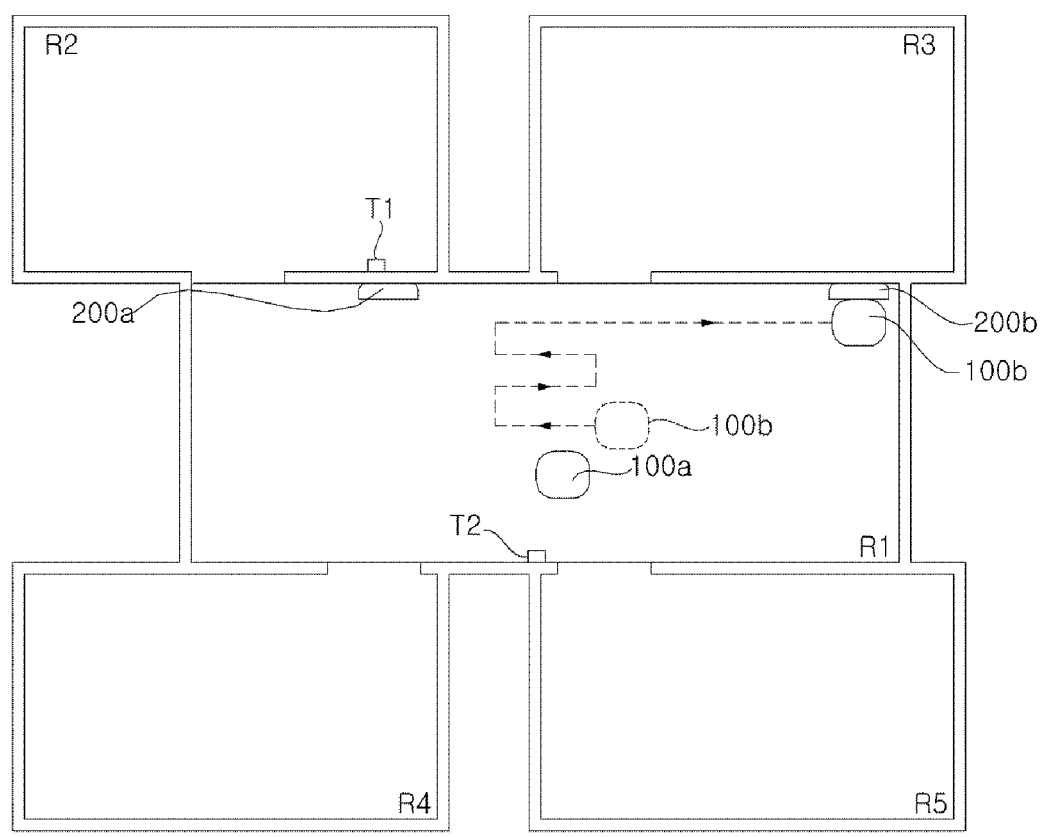

Referring to FIGS. 7C and 8, in order for the second mobile robot 100b to accurately move to the liquid region A1, the second mobile robot 100b may specify the liquid region A1 based on at least one of coordinate values of the liquid region A1 on the obstacle map, an image of the surroundings of the liquid region A1, a received signal strength indicator value between the first mobile robot 100a and the second mobile robot 100b, or a received signal strength indicator value between the routers T1 and T2 and a respective one of the mobile robots.

The controller 1800 may specify the liquid region A1 based on the coordinate values of the liquid region A1 on the obstacle map. The controller 1800 may specify the liquid region A1 based on the image of the surroundings of the main body input by the sensor. The controller 1800 may specify the liquid region A1 based on the coordinates of the liquid region A1 on the obstacle map and the received signal strength indicator (RSSI) value between the communication interface and the first mobile robot 100a. The controller 1800 may specify the liquid region A1 based on the coordinates of the liquid region A1 on the obstacle map and the received signal strength indicator (RSSI) value between the routers T1 and T2 and the second mobile robot 100b. The controller 1800 may specify the liquid region A1 based on the coordinates of the liquid region A1 on the obstacle map and the detection values detected by the routers T1 and T2 and the liquid detection sensor.

As an example of the method of specifying the liquid region A1 by the second mobile robot 100b, the second mobile robot 100b may specify the liquid region A1 based on the coordinate values of the liquid region A1 on the received obstacle map and the detection value detected by the sensor thereof.

As another example of the method of specifying the liquid region A1 by the second mobile robot 100b, the second mobile robot 100b may specify the liquid region A1 based on the coordinate values of the liquid region A1 on the received obstacle map, the image of the surroundings of the liquid region A1, and the detection value detected by the sensor thereof. Specifically, the second mobile robot 100b may move based on the coordinate values of the liquid region A1, and may detect a position matching the image of the surroundings of the liquid region A1 received from the surroundings of the liquid region A1. That is, the second mobile robot 100b may collect an image of the surroundings thereof including the ceiling using the sensor, and may determine whether the received image of the surroundings of the liquid region A1 matches the image of the surroundings thereof. Upon determining that the received image of the surroundings of the liquid region A1 matches the image of the surroundings thereof, the second mobile robot 100b may specify the corresponding position as the liquid region A1. Here, the image of the surroundings of the liquid region A1 may include an artificial mark.

As still another example of the method of specifying the liquid region A1 by the second mobile robot 100b, the second mobile robot 100b may specify the liquid region A1 based on the coordinate values of the liquid region A1 on the received obstacle map, the received signal strength indicator value between at least one router T1 and T2 and a respective one of the mobile robots, and the detection value detected by the sensor thereof.

Specifically, the second mobile robot 100b may move based on the coordinate values of the liquid region A1, may measure the received signal strength indicator value between the second mobile robot 100b and the routers T1 and T2 while traveling near the liquid region A1, and may compare the measured received signal strength indicator value thereof with the received signal strength indicator value between the routers T1 and T2 and the first mobile robot 100a. When the received signal strength indicator value thereof is the same as or similar to the received signal strength indicator value of the first mobile robot 100a, the second mobile robot 100b may specify the corresponding position as the liquid region A1.

The mobile robots may be connected to the routers T1 and T2 through short-range or medium-range wireless communication. Since the received signal strength indicator value varies depending on the distance between each router T1 or T2 and each mobile robot, it is possible to specify the exact position based on the received signal strength indicator value.

As still another example of the method of specifying the liquid region A1 by the second mobile robot 100b, the first mobile robot 100a may stand by in the vicinity of the liquid region A1 until the second mobile robot 100b completely moves to the liquid region A1 (S117). Specifically, the first mobile robot 100a may detect the approach of the second mobile robot 100b based on the collected image or the received signal strength indicator value between the first mobile robot 100a and the second mobile robot 100b. The second mobile robot 100b may specify the liquid region A1 based on the coordinate values of the liquid region A1 on the received obstacle map and the received signal strength indicator value between the first mobile robot 100a and the second mobile robot 100b.

Specifically, the second mobile robot 100b may move based on the coordinate values of the liquid region A1, may measure the received signal strength indicator value between the second mobile robot 100b and the first mobile robot 100a while traveling near the liquid region A1, and may compare the measured received signal strength indicator value thereof with a predetermined received signal strength indicator value. When the measured received signal strength indicator value exceeds the predetermined received signal strength indicator value, the second mobile robot 100b may specify the corresponding position as the liquid region A1.

In still another example, the liquid detection sensor 1411 may be installed on the front lower end of the main body of the second mobile robot 100b, and the second mobile robot 100b may specify the liquid region A1 based on the coordinate values of the liquid region A1 on the received obstacle map and the detection value detected by the liquid detection sensor 1411 thereof. Specifically, the second mobile robot 100b may move to the liquid region A1 based on the coordinate values of the liquid region A1, and when the second mobile robot 100b detects a liquid while traveling near the liquid region A1, the second mobile robot 100b may specify the corresponding position as the liquid region A1.

The step S130 of cleaning the liquid region A1 by the second mobile robot 100b may be included.

The cleaning of the liquid region A1 by the second mobile robot 100b may mean that the controller 1800 of the second mobile robot 100b controls the driver of the second mobile robot 100b such that the main body of the second mobile robot 100b travels the liquid region A1 at least once, preferably two or more times. When the second mobile robot 100b travels the liquid region A1, the liquid is removed by a mop installed on the bottom surface of the second mobile robot 100b.

In another example, the cleaning of the liquid region A1 by the second mobile robot 100b may mean that the controller 1800 of the second mobile robot 100b controls the driver of the second mobile robot 100b such that the main body of the second mobile robot 100b travels the liquid region A1 at least once, preferably two or more times, and controls the cleaning device to rotate a mop such as a spin mop.

Upon finishing cleaning the liquid region A1, the second mobile robot 100b may inform the first mobile robot 100a that the cleaning of the liquid region A1 is completed (S135). The controller 1800 of the second mobile robot 100b may control the communication interface to transmit a signal indicating the completion of cleaning of the liquid region A1 to the first mobile robot 100a.

After the second mobile robot 100b finishes cleaning the liquid region A1, the first mobile robot 100a may determine whether a liquid is present in the liquid region A1 (S140). Specifically, upon receiving, from the second mobile robot 100b, a signal indicating the completion of cleaning of the liquid region A1, the first mobile robot 100a may control the liquid detection sensor 1411 to determine whether a liquid is present in the liquid region A1.

As such, since only the first mobile robot 100a detects a liquid, the liquid detection sensor 1411 may be installed only in the first mobile robot 100a, and the liquid detection sensor 1411 may be omitted from the second mobile robot 100b, thereby reducing manufacturing costs.

Upon determining that a liquid is present in the liquid region A1 after the second mobile robot 100b finishes cleaning the liquid region A1, the first mobile robot 100a may transmit a signal for commanding re-cleaning of the liquid region A1 to the second mobile robot 100b (S145).

Upon receiving, from the first mobile robot 100a, the command for re-cleaning of the liquid region A1, the second mobile robot 100b may again clean the liquid region A1 (S160).

Upon determining that no liquid is present in the liquid region A1 after the second mobile robot 100b finishes cleaning the liquid region A1, the first mobile robot 100a may perform cleaning in the cleaning area (S163). Specifically, upon determining that no liquid is present in the liquid region A1, the first mobile robot 100a may clean the cleaning area, excluding the liquid region A1, or may clean the entire cleaning area including the liquid region A1. In this case, the first mobile robot 100a may travel again along the route along which the first mobile robot 100a has traveled before detecting the liquid region A1. The cleaning operation of the first mobile robot 100a may mean that the first mobile robot 100a controls the cleaning device thereof to suction foreign substances using pressure or to sweep and suction foreign substances while traveling.

After finishing cleaning the liquid region A1, the second mobile robot 100b may perform cleaning while traveling after the first mobile robot 100a (S165). Specifically, when the second mobile robot 100b receives a signal for continuously cleaning the cleaning area from the first mobile robot 100a or when the first mobile robot 100a travels away from the liquid region A1, the second mobile robot 100b may perform cooperative cleaning while following the first mobile robot 100a.

In order to realize this following/cooperative cleaning operation, a cooperation scenario may be generated such that the total traveling route or the total traveling time of the first and second mobile robots 100a and 100b is minimized, using a shortest-route algorithm, such as a Dijkstra algorithm or an A* (A-star) algorithm, based on the detected positions relative to each other. Alternatively, a cooperation scenario may be generated such that the first mobile robot 100a and the second mobile robot 100b separately clean the divided cleaning regions respectively assigned thereto based on the cleaning priorities of the plurality of divided regions and the SoC of the batteries of the first and second mobile robots 100a and 100b.

Although cooperative cleaning using two cleaners has been described above by way of example, the present disclosure is not limited thereto. The embodiments of the present disclosure may also be applied to the case in which three or more cleaners perform cooperative cleaning while detecting the positions relative to one another.

As described above, according to the plurality of autonomous-driving cleaners according to the embodiments of the present disclosure, a plurality of mobile robots may efficiently perform cooperative cleaning while detecting the positions of other mobile robots within a designated space without the necessity to install position sensors thereon.

In addition, even when the mobile robots are of different types from each other and thus use respectively different cleaning maps of the same space, the mobile robots may easily perceive the positions relative to each other without additionally sharing a feature map (a simultaneous localization and mapping (SLAM) map). As a result, a cooperation scenario may be efficiently modified or updated according to the positions of the mobile robots relative to each other even while the mobile robots are performing cooperative cleaning.

Figure 9:
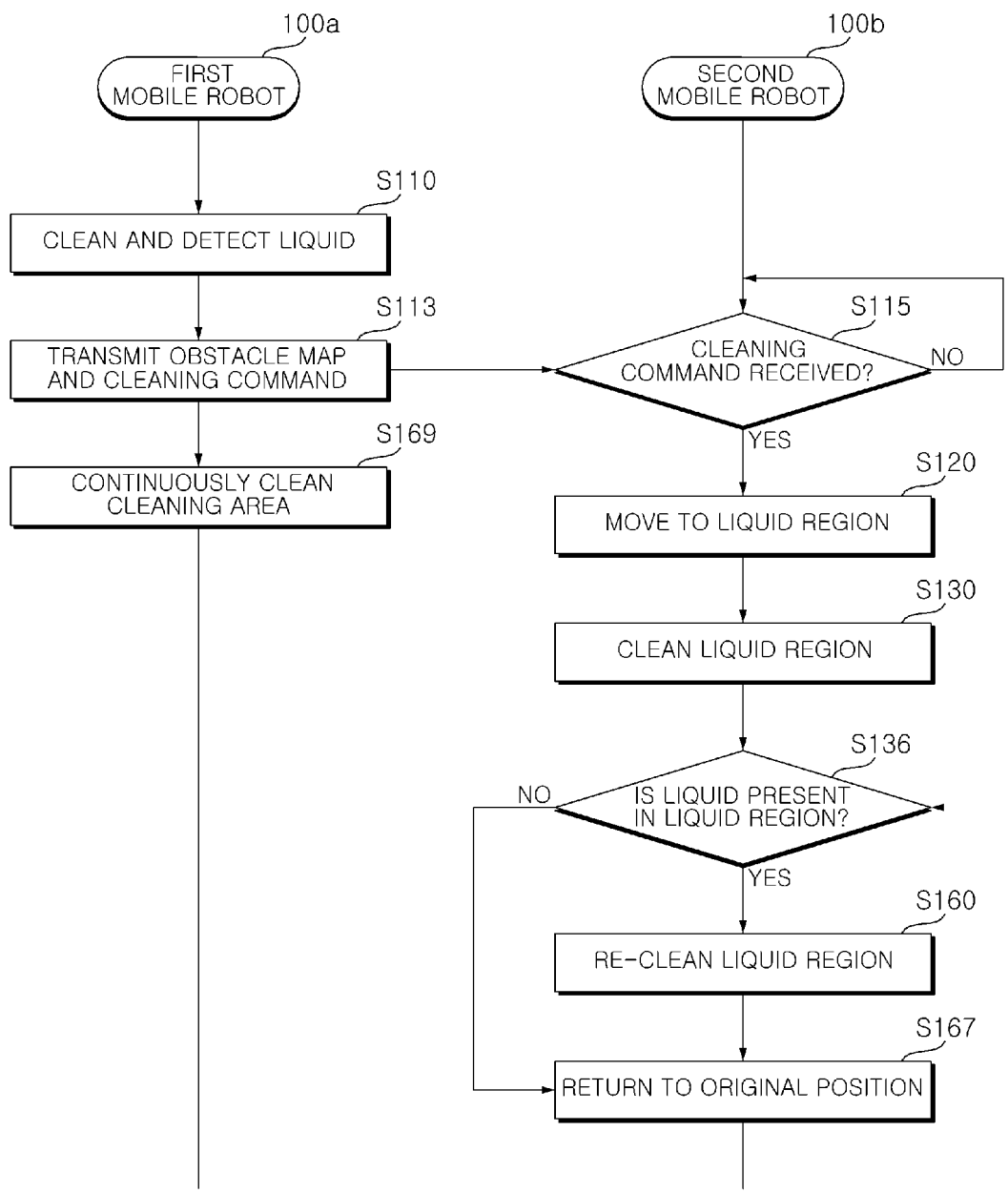
FIG. 9 is a flowchart of a method of controlling a plurality of robot cleaners according to a second embodiment of the present disclosure.

FIG. 9 is a flowchart of a method of controlling a plurality of robot cleaners according to a second embodiment of the present disclosure.

The method of controlling a plurality of robot cleaners according to the second embodiment differs from the method according to the first embodiment in that the first mobile robot 100a transmits a command for cleaning the liquid region A1 to the second mobile robot 100b and immediately cleans the cleaning area, excluding the liquid region A1, and the second mobile robot 100b cleans the liquid region A1, determines the presence or absence of a liquid in the liquid region A1, and returns to the original position thereof.

Hereinafter, a description of the same steps as those of the first embodiment will be omitted, and steps different from those of the first embodiment will be mainly described. The same steps as those of the first embodiment are denoted by the same reference numerals.

After transmitting a command for cleaning the liquid region A1 to the second mobile robot 100b, the first mobile robot 100a may perform cleaning in the cleaning area, excluding the liquid region A1 (S169). The first mobile robot 100a may return to the original position thereof after finishing cleaning the cleaning area.

After finishing cleaning the liquid region A1, the second mobile robot 100b may determine whether a liquid remains in the liquid region A1 using the liquid detection sensor (S136). Upon determining that a liquid remains in the liquid region A1, the second mobile robot 100b may again clean the liquid region A1 (S160).

After finishing cleaning the liquid region A1, the second mobile robot 100b may return to the original position thereof (S167). Specifically, upon determining that no liquid remains in the liquid region A1 or that the re-cleaning operation in the liquid region A1 is completed, the controller 1800 of the second mobile robot 100b may control the driver such that the second mobile robot 100b returns to the original position thereof.

Since the second mobile robot 100b is provided with the liquid detection sensor, the first mobile robot 100a may finish the cleaning operation without waiting for the second mobile robot 100b.

Figure 10:
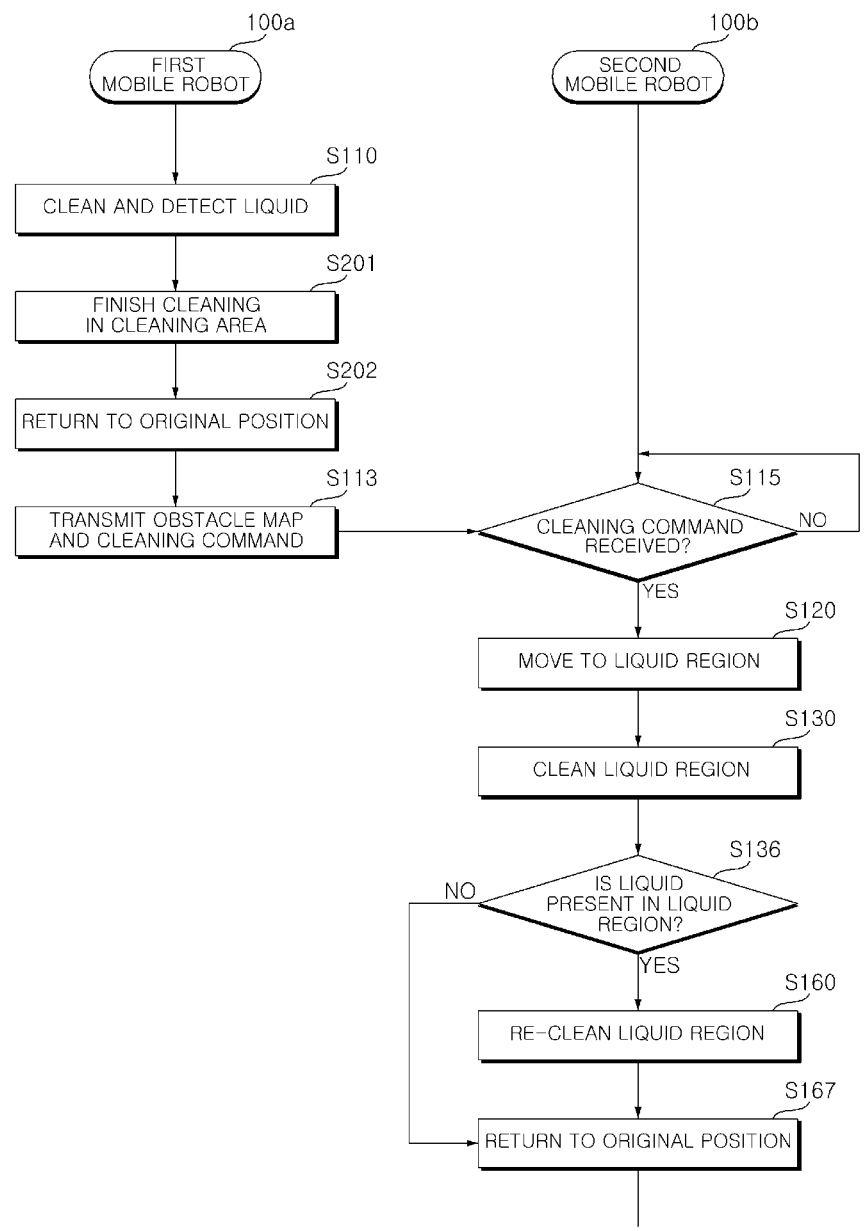
FIG. 10 is a flowchart of a method of controlling a plurality of robot cleaners according to a third embodiment of the present disclosure.

FIG. 10 is a flowchart of a method of controlling a plurality of robot cleaners according to a third embodiment of the present disclosure.

Referring to FIG. 10, the method of controlling a plurality of robot cleaners according to the third embodiment differs from the method according to the second embodiment in that, even when the first mobile robot 100a detects the liquid region A1, the first mobile robot 100a finishes cleaning the cleaning area, and thereafter transmits a command for cleaning the liquid region A1 to the second mobile robot 100b.

The first mobile robot 100a may detect a liquid, and may finish cleaning the cleaning area (S201). After finishing cleaning, the first mobile robot 100a may return to the original position thereof (S202), and may transmit an obstacle map and a command for cleaning the liquid region A1 to the second mobile robot 100b.

Figure 11:
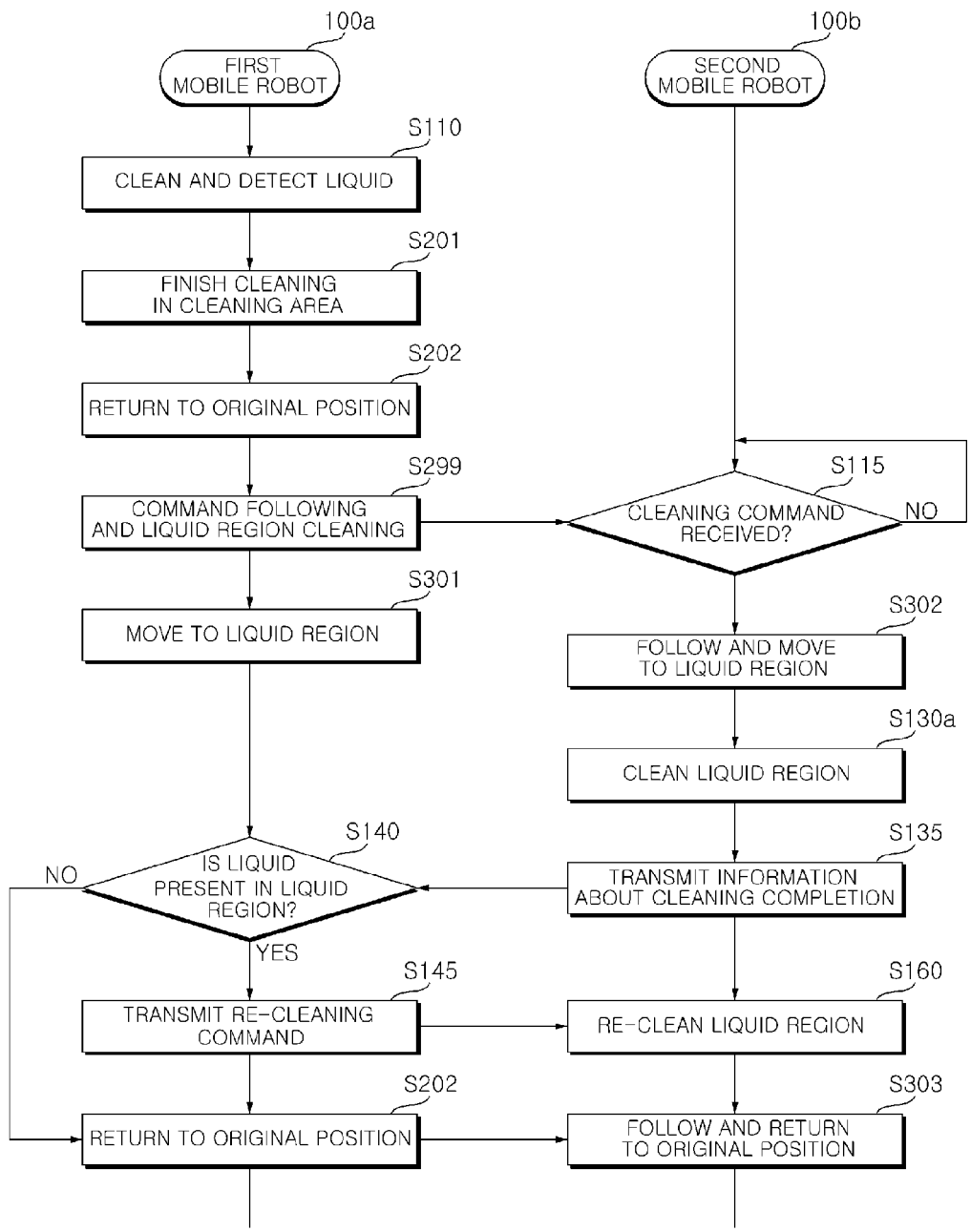
FIG. 11 is a flowchart of a method of controlling a plurality of robot cleaners according to a fourth embodiment of the present disclosure.

FIG. 11 is a flowchart of a method of controlling a plurality of robot cleaners according to a fourth embodiment of the present disclosure.

Referring to FIG. 11, the method of controlling a plurality of robot cleaners according to the fourth embodiment differs from the method according to the third embodiment in that, when the first mobile robot 100a detects the liquid region A1, the first mobile robot 100a moves to the position of the second mobile robot 100b, and leads the second mobile robot 100b to the liquid region A1 such that the second mobile robot 100b follows the first mobile robot 100a to the liquid region A1 and cleans the liquid region A1.

Thus, this cleaning method makes it unnecessary for the first mobile robot 100a and the second mobile robot 100b to share an obstacle map therebetween and also makes it unnecessary to additionally install a liquid detection sensor on the second mobile robot 100b.

The control method according to this embodiment may include detecting, by the first mobile robot 100a, a liquid present in the cleaning area (S110), completely cleaning, by the first mobile robot 100a, the cleaning area, excluding the liquid region A1 (S201), moving the first mobile robot 100a to the vicinity of the second mobile robot 100b (S202), upon detecting a liquid by the first mobile robot 100a, transmitting a follow command from the first mobile robot 100a to the second mobile robot 100b (S299) and moving the first mobile robot 100a to the liquid region A1 (S301), upon receiving the follow command by the second mobile robot 100b, controlling the second mobile robot 100b to follow the first mobile robot 100a to the liquid region A1 (S302), and cleaning, by the second mobile robot 100b, a predetermined region near the first mobile robot 100a after the first mobile robot 100a arrives at the liquid region A1 (S130a).

The first mobile robot 100a may detect a liquid while cleaning the cleaning area (S110), and may finish cleaning the cleaning area (S201). After finishing cleaning, the first mobile robot 100a may return to the original position thereof (the vicinity of the second mobile robot 100b) (S202). Thereafter, upon detecting a liquid, the first mobile robot 100a may transmit a follow command and a liquid region cleaning command to the second mobile robot 100b, and may move to the liquid region A1 (S299).

The second mobile robot 100b may perform the follow command so as to follow the first mobile robot 100a to the liquid region A1 (S302). After the first mobile robot 100a arrives at the liquid region A1, the second mobile robot 100b may regard a predetermined region near the first mobile robot 100a as the liquid region A1, and may perform cleaning (S130a).

Thereafter, the first mobile robot 100a may detect the presence or absence of a liquid in the liquid region A1 to determine whether the liquid region A1 has been completely cleaned (S140). Upon detecting the presence of a liquid in the liquid region A1, the first mobile robot 100a may command the second mobile robot 100b to again clean the liquid region A1, and upon detecting the absence of a liquid in the liquid region A1, the first mobile robot 100a may return to the original position thereof (S202).

Upon receiving the re-cleaning command from the first mobile robot 100a, the second mobile robot 100b may again clean the liquid region A1. Upon finishing re-cleaning the liquid region A1, the second mobile robot 100b may follow the first mobile robot 100a to again return to the original position thereof (S303).

According to the mobile robot of the present disclosure, there are one or more effects as follows.

First, each of mobile robots, which perform cleaning in different manners from each other, distinguishes between a region that the corresponding mobile robot is capable of cleaning and a region that the corresponding mobile is incapable of cleaning, thereby performing a cleaning operation suitable for the state of a cleaning area.

Second, when a dry-type cleaner detects a liquid during cleaning, a wet-type cleaner specialized for cleaning a liquid removes the liquid, thereby preventing deterioration in suction performance and damage to a filter of the dry-type cleaner, which may occur when the dry-type cleaner suctions a liquid, while effectively removing a liquid.

Third, since a liquid is accurately detected using a humidity sensor, a camera, or the like, even when a liquid to be removed has high viscosity, a wet-type cleaner may repeatedly clean the liquid until the cleaning operation is finished, thereby completely removing the liquid.

Fourth, a dry-type cleaner may stand by near a liquid region, and a wet-type cleaner may specify the liquid region according to the intensity of a communication signal exchanged with the dry-type cleaner, thereby preventing a problem in which the wet-type cleaner is incapable of accurately detecting a liquid region using only the coordinate values of the liquid region.

Fifth, since the position of a liquid region is more accurately detected based on the intensity value of a communication signal exchanged with a router and an image of the surroundings of the liquid region, a wet-type cleaner may accurately move to the liquid region even when a dry-type cleaner performs another type of operation.

Sixth, when a dry-type cleaner detects a liquid, the dry-type cleaner may return to the original position thereof after finishing cleaning, and may lead a wet-type cleaner to a liquid region such that the wet-type cleaner cleans the liquid region, thereby making it unnecessary for the dry-type cleaner to transmit an obstacle map to the wet-type cleaner and enabling the wet-type cleaner to accurately move to the liquid region.

Seventh, different types of cleaning maps, which are collected by different types of mobile robots with respect to the same space, may be efficiently and accurately matched using an artificial mark.

However, the effects achievable through the present disclosure are not limited to the above-mentioned effects, and other effects not mentioned herein will be clearly understood by those skilled in the art from the appended claims.

It will be apparent that, although the preferred embodiments have been shown and described above, the present disclosure is not limited to the above-described specific embodiments, and various modifications and variations can be made by those skilled in the art without departing from the gist of the appended claims. Thus, it is intended that the modifications and variations should not be understood independently of the technical spirit or prospect of the present disclosure.

The invention claimed is:

1. A method of controlling a plurality of robots comprising a first robot and a second robot configured to perform a different cleaning operation from the first robot, the method comprising:

detecting, by the first robot, a liquid in a cleaning area;

after detecting the liquid, transmitting, by the first robot, an obstacle map comprising position information for a liquid region and a liquid region cleaning command to the second robot;

after receiving the liquid region cleaning command by the second robot, controlling the second robot to move to the liquid region, wherein the first robot stands by in a vicinity of the liquid region until the second robot moves to the liquid region;

controlling the second robot to clean the liquid region;

determining, by the first robot, whether a liquid is present in the liquid region after the second robot finishes cleaning the liquid region; and after detecting no liquid in the liquid region after the second robot finishes cleaning the liquid region, controlling the first robot to clean the cleaning area.

2. The method of claim 1, wherein the second robot is further configured to specify the liquid region based on at least one of coordinate values of the liquid region included on the obstacle map, an image of surroundings of the liquid region, a received signal strength indicator value between the first robot and the second robot, or a received signal strength indicator value between a router and each of the first robot and the second robot.

3. The method of claim 1, further comprising:

after detecting a liquid in the liquid region after the second robot finishes cleaning the liquid region, transmitting from the first robot to the second robot a signal for commanding cleaning of the liquid region.

4. The method of claim 1, further comprising:

after the second robot finishes cleaning the liquid region, controlling the second robot to clean while following the first robot.

5. The method of claim 1, further comprising:

after the second robot finishes cleaning the liquid region, controlling the second robot to return to an original position thereof.

6. A method of controlling a plurality of robots comprising a first robot and a second robot configured to perform a different cleaning operation from the first robot, the method comprising:

detecting, by the first robot, a liquid in a cleaning area;

moving the first robot to a vicinity of the second robot after the first robot finishes cleaning the cleaning area;

after detecting that a liquid is present, transmitting, by the first robot, a follow command to the second robot and moving the first robot to a liquid region;

after receiving the follow command, controlling the second robot to follow the first robot to the liquid region;

controlling the second robot to clean a predetermined region near the first robot after the first robot arrives at the liquid region;

determining, by the first robot, whether a liquid is present in the liquid region after the second robot finishes cleaning the liquid region; and after detecting no liquid in the liquid region after the second robot finishes cleaning the liquid region, controlling the first robot to clean the cleaning area.

* * * * *